Oct. 30, 1956 W. E. WARD 2,768,394
DISENGAGEABLE DRIVE MEANS IN A HEADING MACHINE
Filed May 20, 1953 12 Sheets-Sheet 2

INVENTOR.
WILLIAM E. WARD
BY Hudson, Boughton,
Williams, David & Hoffmann
ATTORNEYS

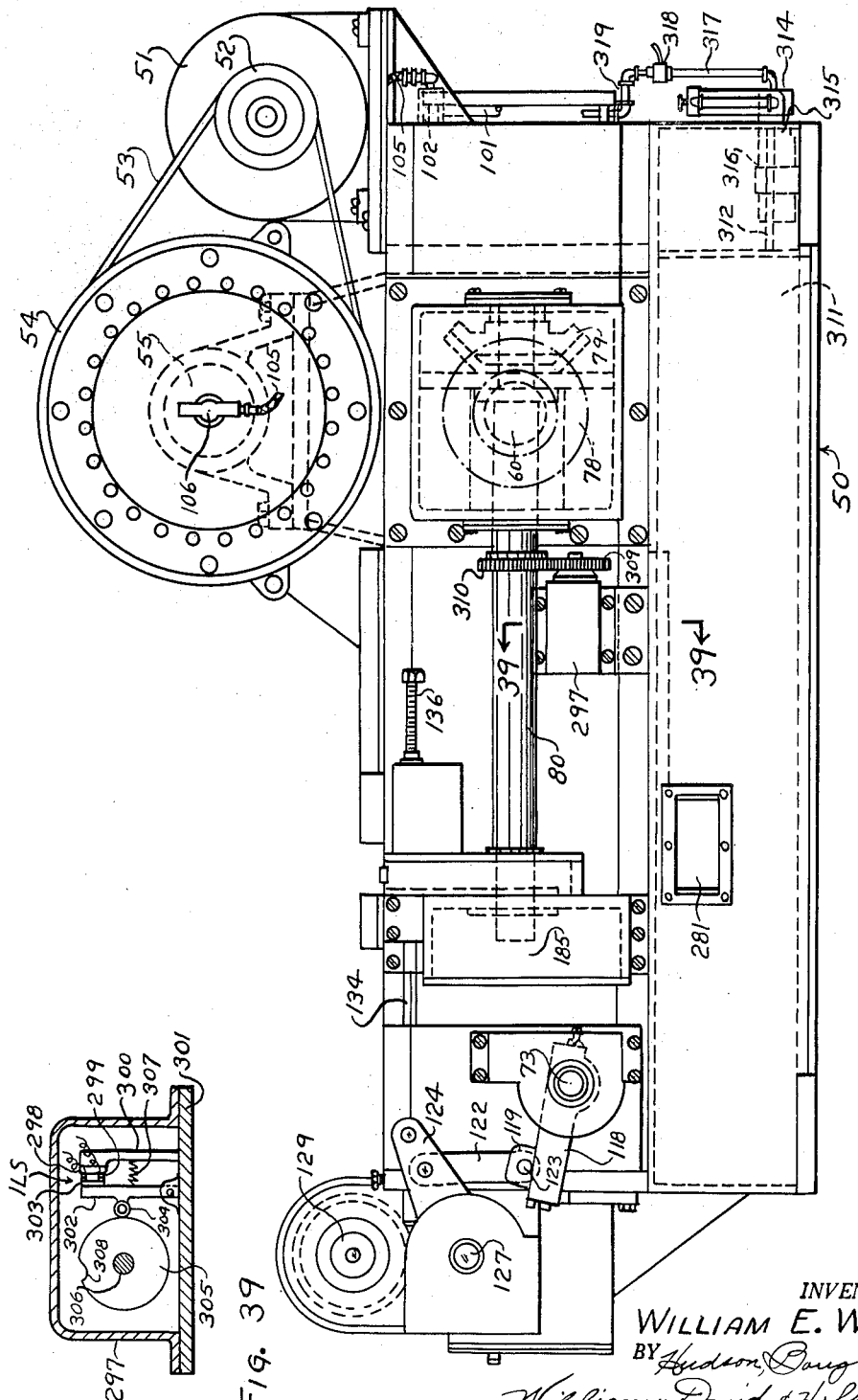

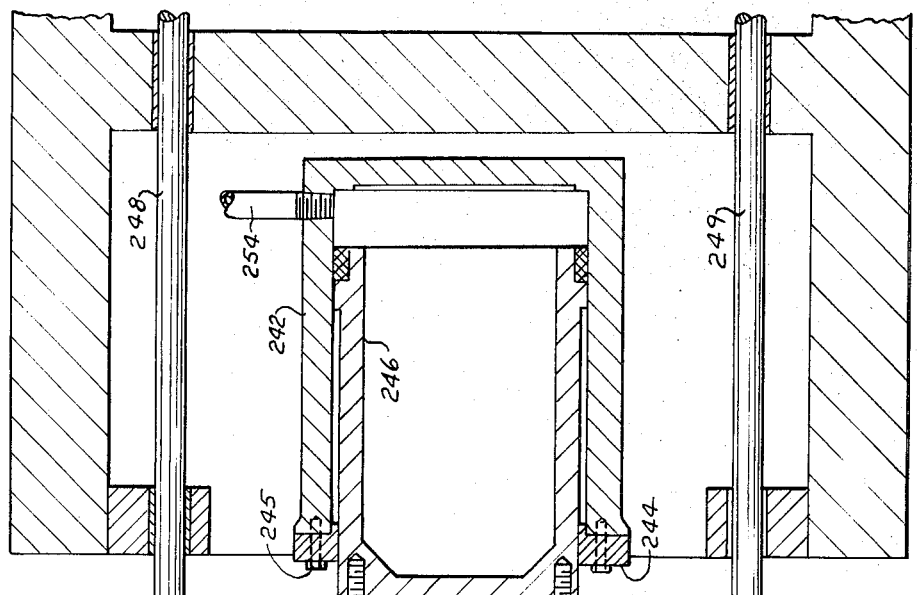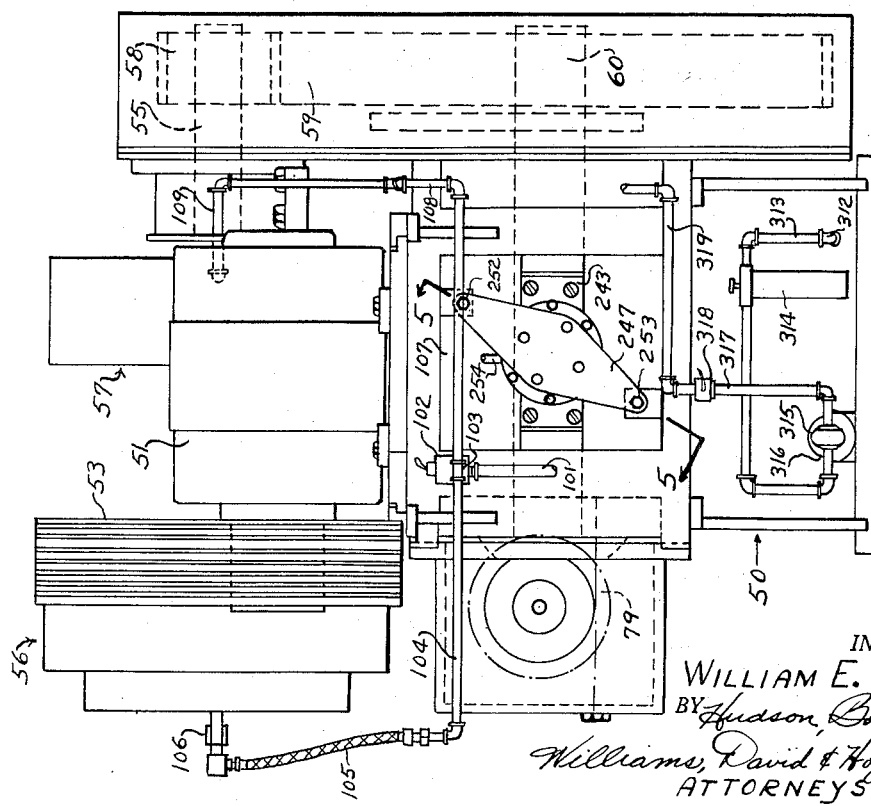

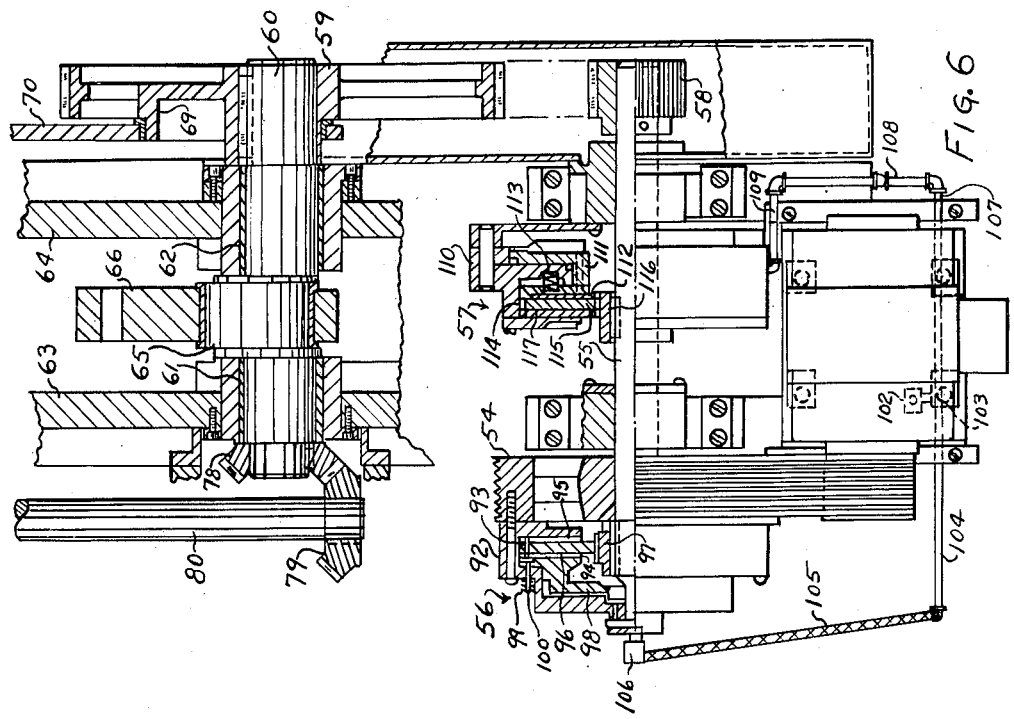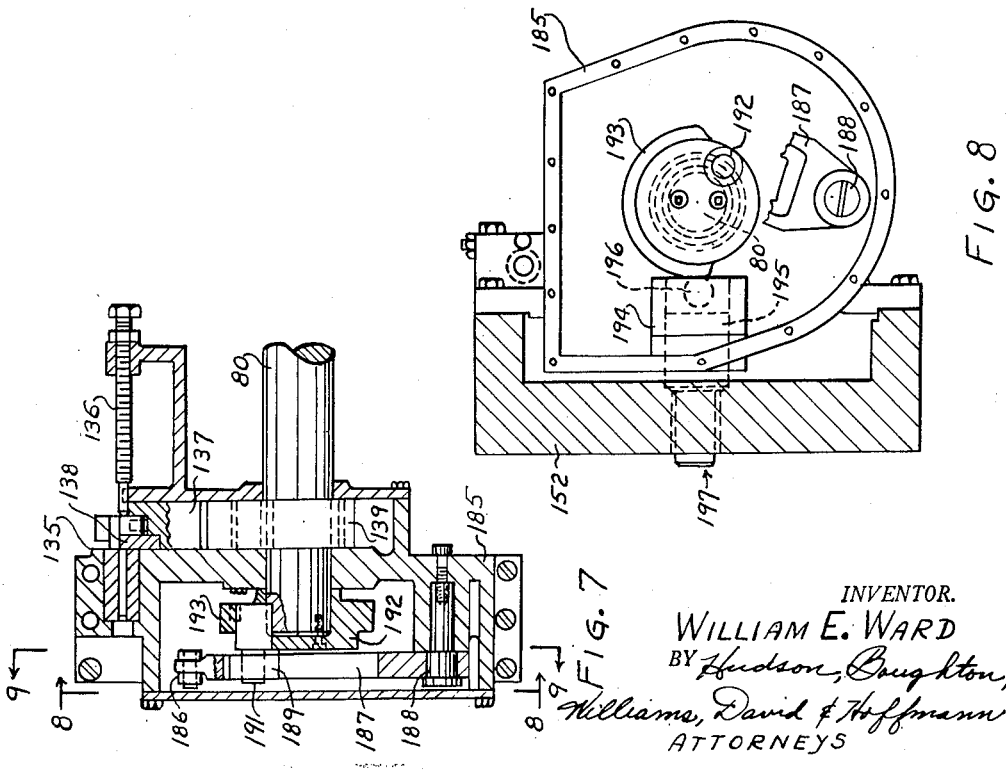

INVENTOR.
WILLIAM E. WARD
BY Hudson, Boughton
Williams, David & Hoffmann
ATTORNEYS

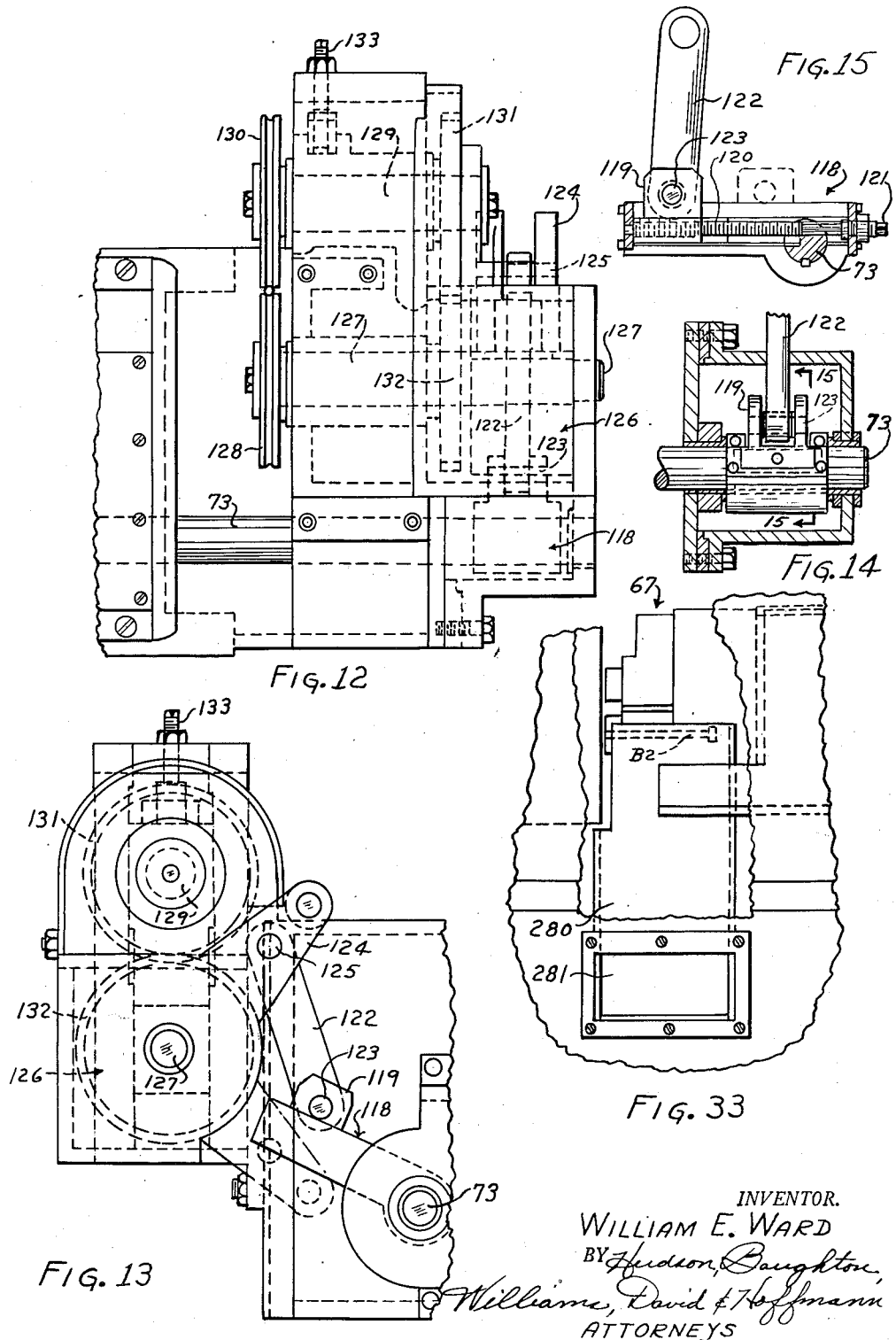

Oct. 30, 1956 W. E. WARD 2,768,394
DISENGAGEABLE DRIVE MEANS IN A HEADING MACHINE
Filed May 20, 1953 12 Sheets-Sheet 8
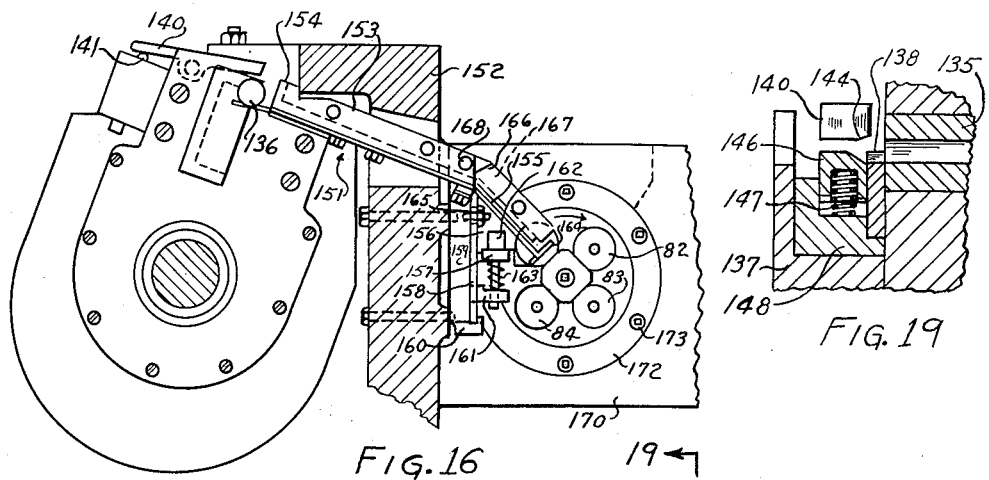
FIG. 16
FIG. 19
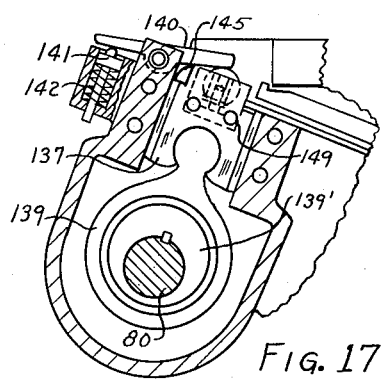
FIG. 17
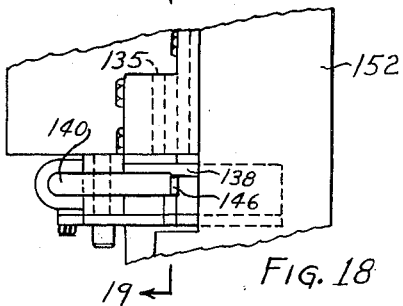
FIG. 18
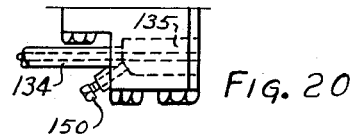
FIG. 20
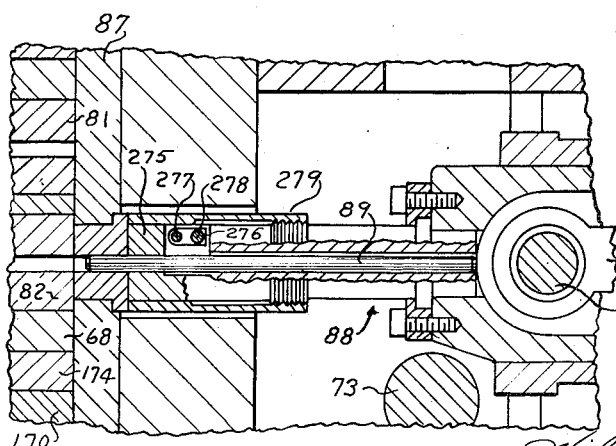
FIG. 32
INVENTOR.
WILLIAM E. WARD
BY Hudson, Boughton,
Williams, David & Hoffmann
ATTORNEYS Oct. 30, 1956 W. E. WARD 2,768,394
DISENGAGEABLE DRIVE MEANS IN A HEADING MACHINE
Filed May 20, 1953 12 Sheets-Sheet 9
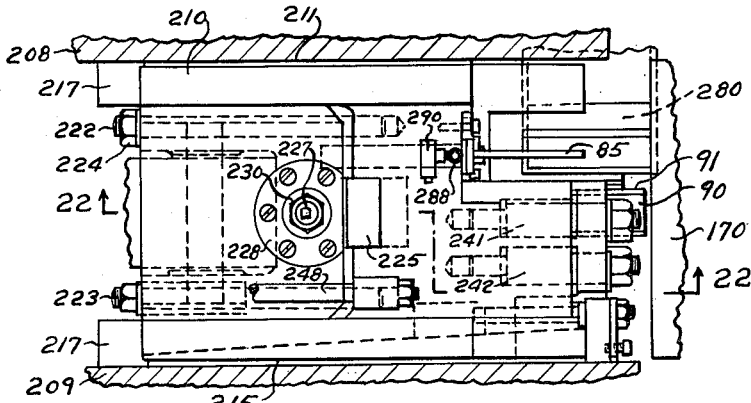
FIG. 21
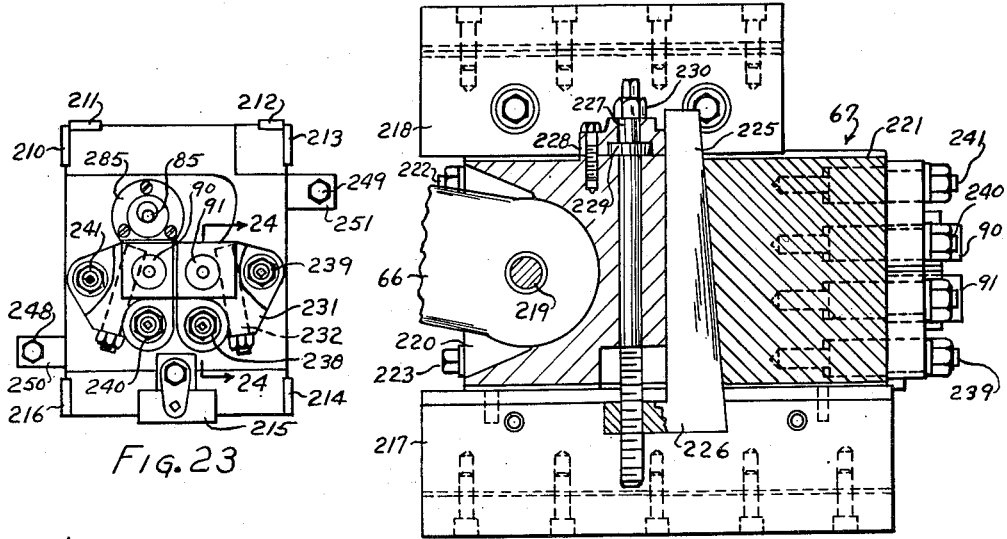
FIG. 23
FIG. 22
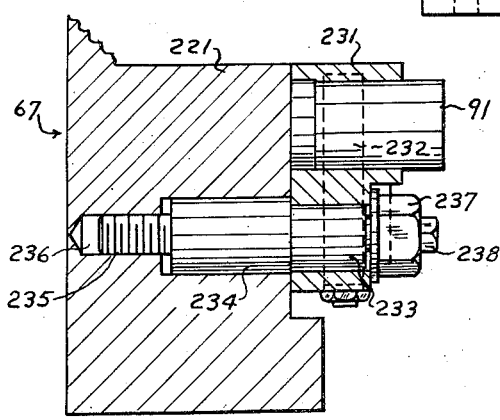
FIG. 24
INVENTOR.
WILLIAM E. WARD
BY Hudson, Boughton,
Williams, David & Hoffmann
ATTORNEYS Oct. 30, 1956 W. E. WARD 2,768,394
DISENGAGEABLE DRIVE MEANS IN A HEADING MACHINE
Filed May 20, 1953 12 Sheets-Sheet 10
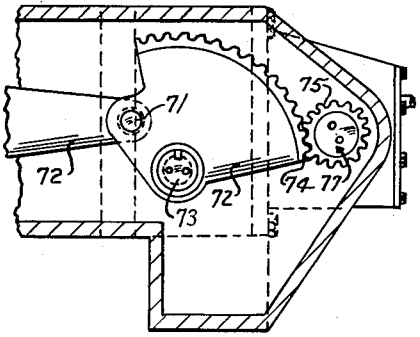
FIG. 25
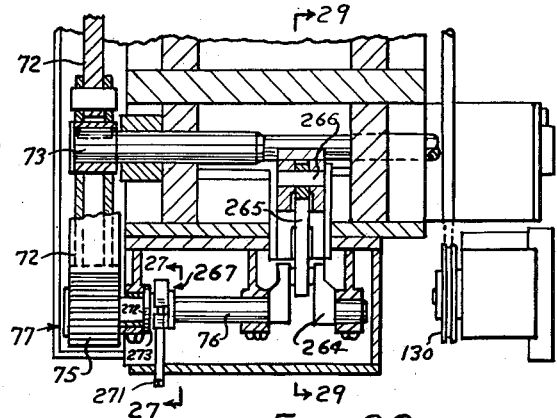
FIG. 26
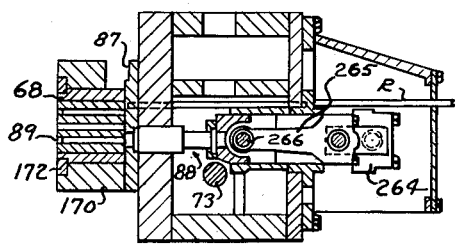
FIG. 29
FIG. 31    FIG. 27
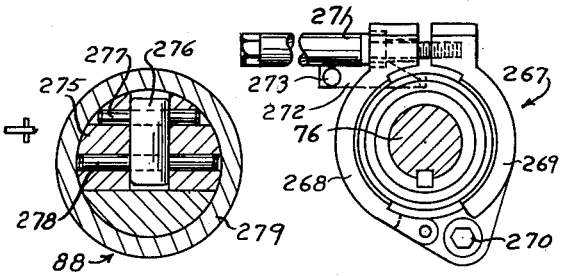
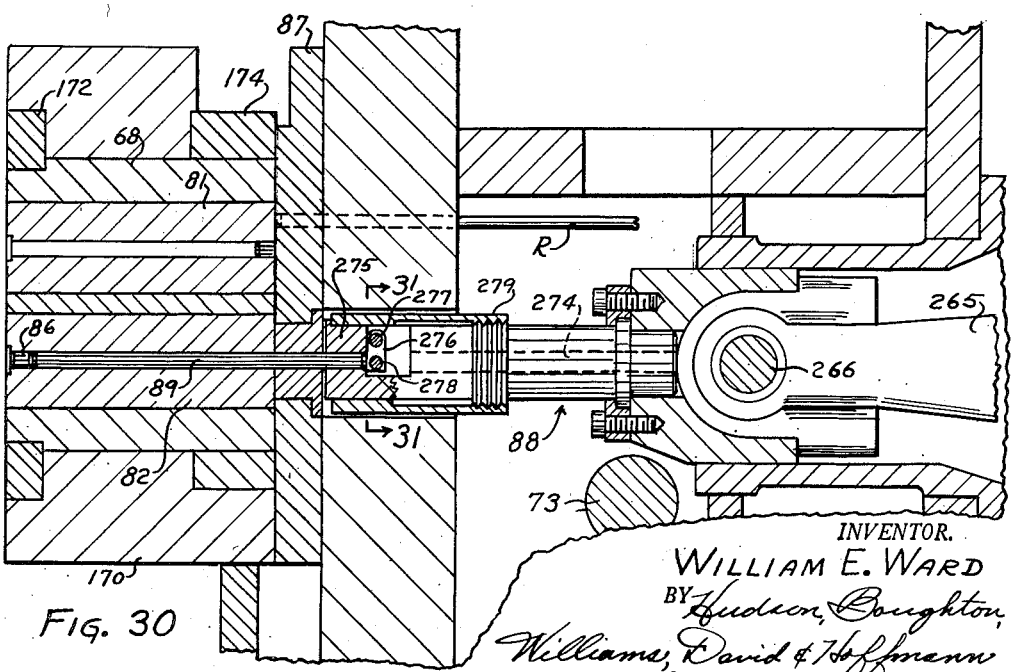
FIG. 30
INVENTOR.
WILLIAM E. WARD
BY
ATTORNEYS Oct. 30, 1956 W. E. WARD 2,768,394
DISENGAGEABLE DRIVE MEANS IN A HEADING MACHINE
Filed May 20, 1953 12 Sheets-Sheet 11
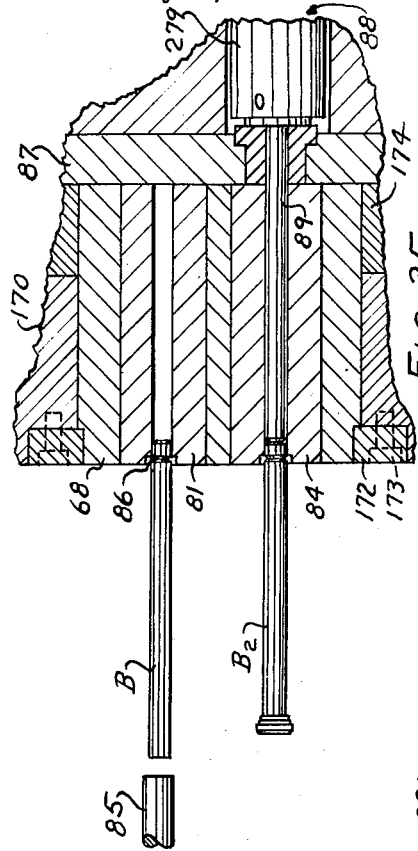
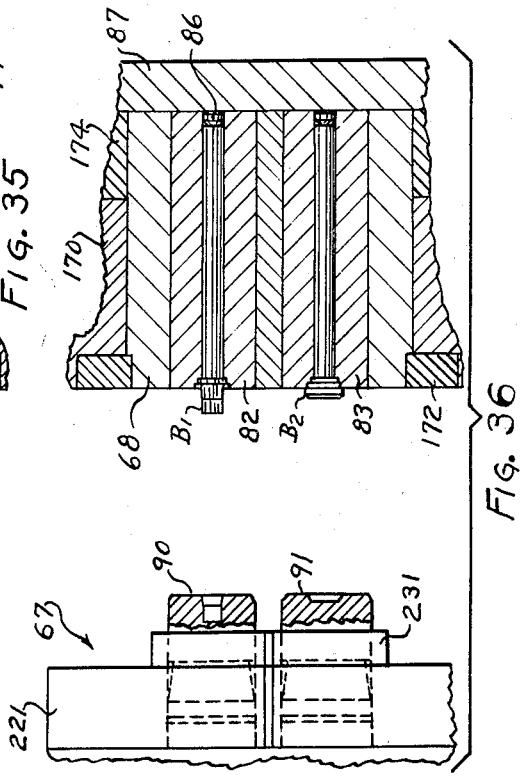
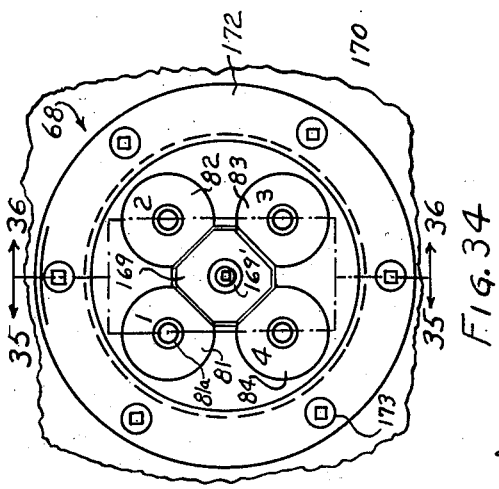
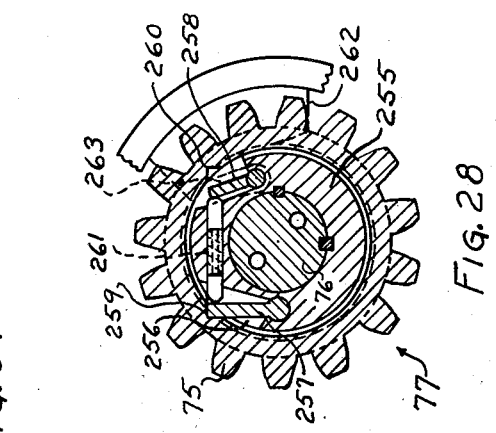
INVENTOR.
WILLIAM E. WARD
BY Hudson, Boughton,
Williams, David & Hoffmann
ATTORNEYS Oct. 30, 1956 W. E. WARD 2,768,394
DISENGAGEABLE DRIVE MEANS IN A HEADING MACHINE
Filed May 20, 1953 12 Sheets-Sheet 12
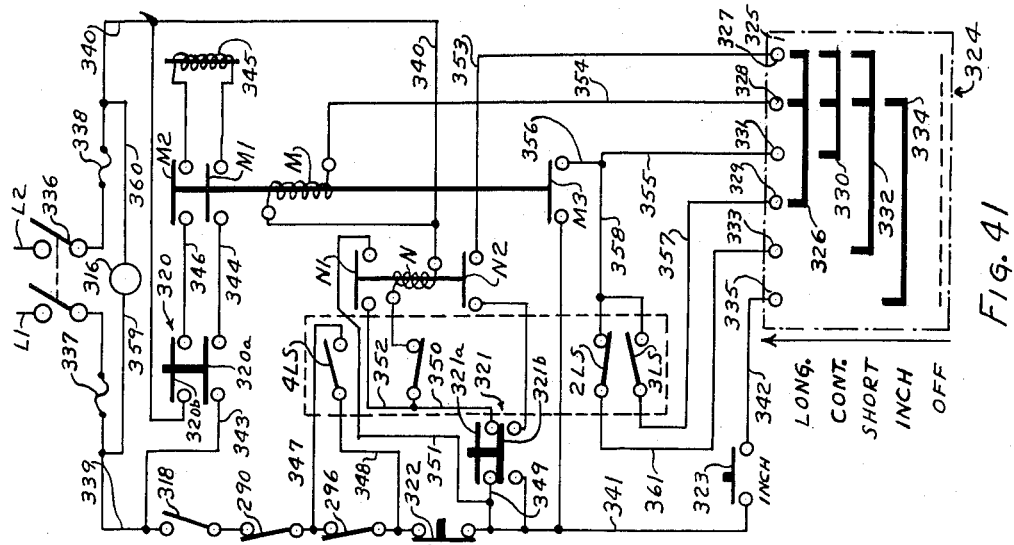
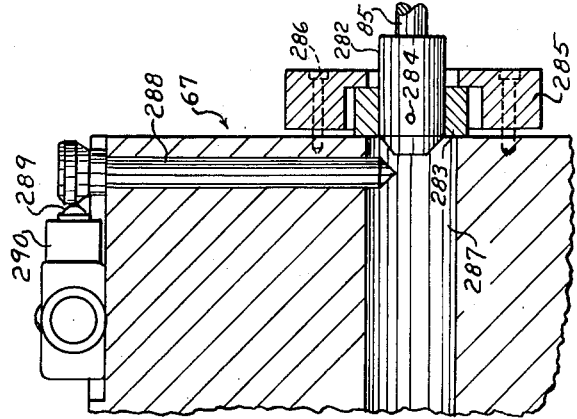
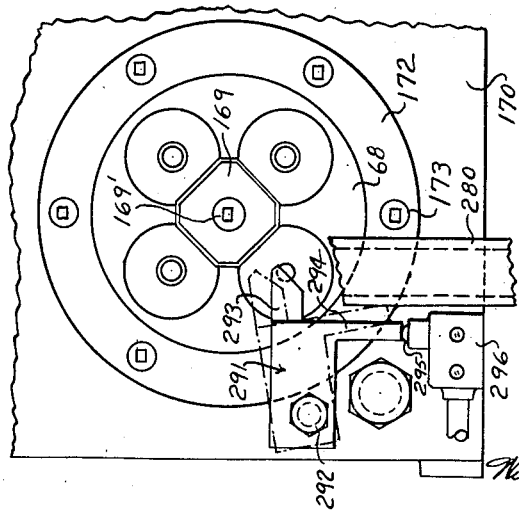
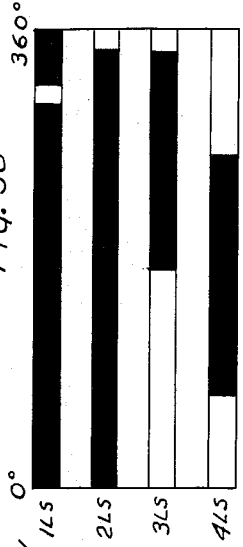
INVENTOR.
WILLIAM E. WARD
ATTORNEYS

2,768,394

DISENGAGEABLE DRIVE MEANS IN A HEADING MACHINE

William E. Ward, Shaker Heights, Ohio, assignor to Chandler Products Corporation, Euclid, Ohio, a corporation of Ohio Application May 29, 1953, Serial No. 356,142

5 Claims. (Cl. 10—13)

This invention relates to a header or like machine and, more particularly, to a machine for forming heads on elongated blanks by an upsetting operation preformed axially on an end thereof.

In the art of making bolts or like headed articles the stock, in the form of coils or lengths of rods, is severed into blanks of predetermined lengths which are then introduced into hollow dies. One end of each blank is then engaged by an axially movable punch while the other end of the blank is held from movement so that the engaged end is upset to form a head thereon, after which the blank is removed from the die. It is customary in forming bolt heads in this manner to effect the required upsetting in two or more steps by sequentially engaging each blank with the requisite number and types of punches. This necessitates relative movement between the punch or punches and the die or dies transversely of the path of reciprocation of the punches or the blanks must be moved to different dies after each upsetting operation so that the blanks may be successively engaged with each punch. In conventional bolt heading machines the punches are usually carried by a slide reciprocable towards and from the dies and the aforementioned transverse movement has generally been effected by laterially shifting the punches relative to the slide and hence the formation of a complete head on each blank requires two or more reciprocations of the slide.

An object of the invention is to provide an improved heading machine the output of which is materially increased over that of conventional machines for a given rate of reciprocation of the punch carrying slide.

Another object of this invention is to provide an improved heading machine wherein a plurality of dies are supported for rotatable indexing relative to the punch carrying slide with a new blank being introduced into a die, each of the punches on the slide cooperating with previously introduced blanks, and a headed blank being discharged upon each reciprocation of the slide thereby increasing the rate of output of headed blanks, a means also being provided to automatically terminate operation of the machine if a headed blank is not discharged therefrom on each reciprocation of the slide.

Another object of the invention is to provide an improved heading machine as defined above wherein means are provided to terminate operation of the machine if the blank supplied to a die upon reciprocation of the slide does not properly enter the die.

An additional object of the invention is to provide an improved heading machine as defined above wherein the die support is rotatably indexed by a novel mechanism actuated from the slide reciprocating means.

A further object of the invention is to provide an improved heading machine as defined above wherein the die support is locked against movement between the indexing actuations thereof by an improved means insuring positive engagement of the lock member with the die support under predetermined pressure thereby obviating the possibility of improper rotative movement of the dies during the time when the latter must remain stationary.

An additional object of the invention is to provide an improved heading machine of the type mentioned above with an improved means for adjusting the punches transversely of the slide to secure desired alignment between the dies and punches.

Another object of the invention is to provide an improved heading machine as defined above wherein the slide is provided with a pneumatic counterbalancing means to prevent engagement of the punches with the dies when no blanks are disposed therein.

It is also an object of the invention to provide an improved heading machine as defined above wherein the blanks are severed from stock in timed relationship with the reciprocation of the punch slide and means are provided to prevent bending of the blanks during the severing operation thereby insuring straight blanks for insertion in the hollow dies.

A further object of the invention is to provide an improved means for receiving severed blanks and positioning the latter for axial entrance into the hollow dies of a heading machine, the blank receiving means being so constructed and arranged that it may be readily adjusted to facilitate axial alignment of blanks of different diameters with respect to said dies.

Another object of the invention is to provide an improved means for removing an upset blank from a hollow die comprising two relatively telescoping parts held in extending position by a frangible member which is adapted to break upon encountering a blank jammed in a die thereby permitting relative movement between the two parts so that other portions of the machine are not broken.

An additional object of the invention is to provide an improved means for removing a completed blank from a hollow die, carried in a rotatable support, comprising a member reciprocating in timed relationship with the indexing of the dies and reciprocation of the slide of the machine through a drive including a crankshaft provided with a unidirectional clutch, a means being provided to prevent overrunning and/or reverse rotation of the crankshaft thereby insuring proper operation of the removing means.

Another object of the invention is to provide an improved heading machine, as defined above, with selective control means whereby the machine may be readily conditioned for either single cycle or continuous operation.

A more specific object of the invention is to provide an improved heading machine including self-contained means for severing elongated stock into blanks of predetermined lengths; means for receiving the severed blanks and delivering them in oriented position for sequential axial feeding into hollow dies carried by a rotatable support, which support is rotatably indexed in timed relationship with reciprocation of a punch carrying slide axially of the dies, so that the blanks are sequentially upset; and means including an axially reciprocating member moving in timed relationship with the reciprocations of said slide to remove the headed blanks; all moving parts of the machine being driven from a single rotatable member connectible to a driving member by an electrically controlled clutch with means being provided to effect automatic disengagement of said clutch in the event a blank is not properly fed into a die and an upset blank removed from a die upon each reciprocation of said slide.

The invention further resides in certain novel features of the construction and in the combination of parts of an apparatus in which the invention is embodied, and further objects and advantages of the invention will be apparent to those skilled in the art to which the invention pertains from the following description of the presently preferred embodiment thereof described with reference to the accompanying drawings, forming a part of this application, in which:

Fig. 3 is a side elevational view of the opposite side of the machine from that shown in Fig. 2, certain parts being omitted and others being shown only in outline;

Fig. 4 is an end elevational view of the machine as seen when looking from the left of Fig. 1;

Fig. 5 is an enlarged, fragmentary, sectional view through the slide counterbalancing cylinder of the machine, the view being taken longitudinally of the cylinder substantially on the section indicating line 5—5 of Fig. 4;

Fig. 6 is a developed view of the main drive shaft and slide crankshaft of the machine, the main drive shaft being shown partially in top elevation and partially in longitudinal section, and the slide crankshaft being shown in longitudinal section and displaced from its actual location beneath the main drive shaft to more clearly reveal the driving relationship between the shafts;

Fig. 7 is a fragmentary sectional view taken substantially on the section indicating line 7—7 of Fig. 1 and showing the die indexing drive, locking pin cam, and the drive for the blank severing means;

Fig. 8 is a detached sectional view taken substantially on the section indicating line 8—8 of Fig. 7 with the locking pin cam and indexing drive rotated approximately 90° from the positions shown in Fig. 7 and with portions of the indexing mechanism broken away to more clearly show the locking pin cam;

Figure 1:
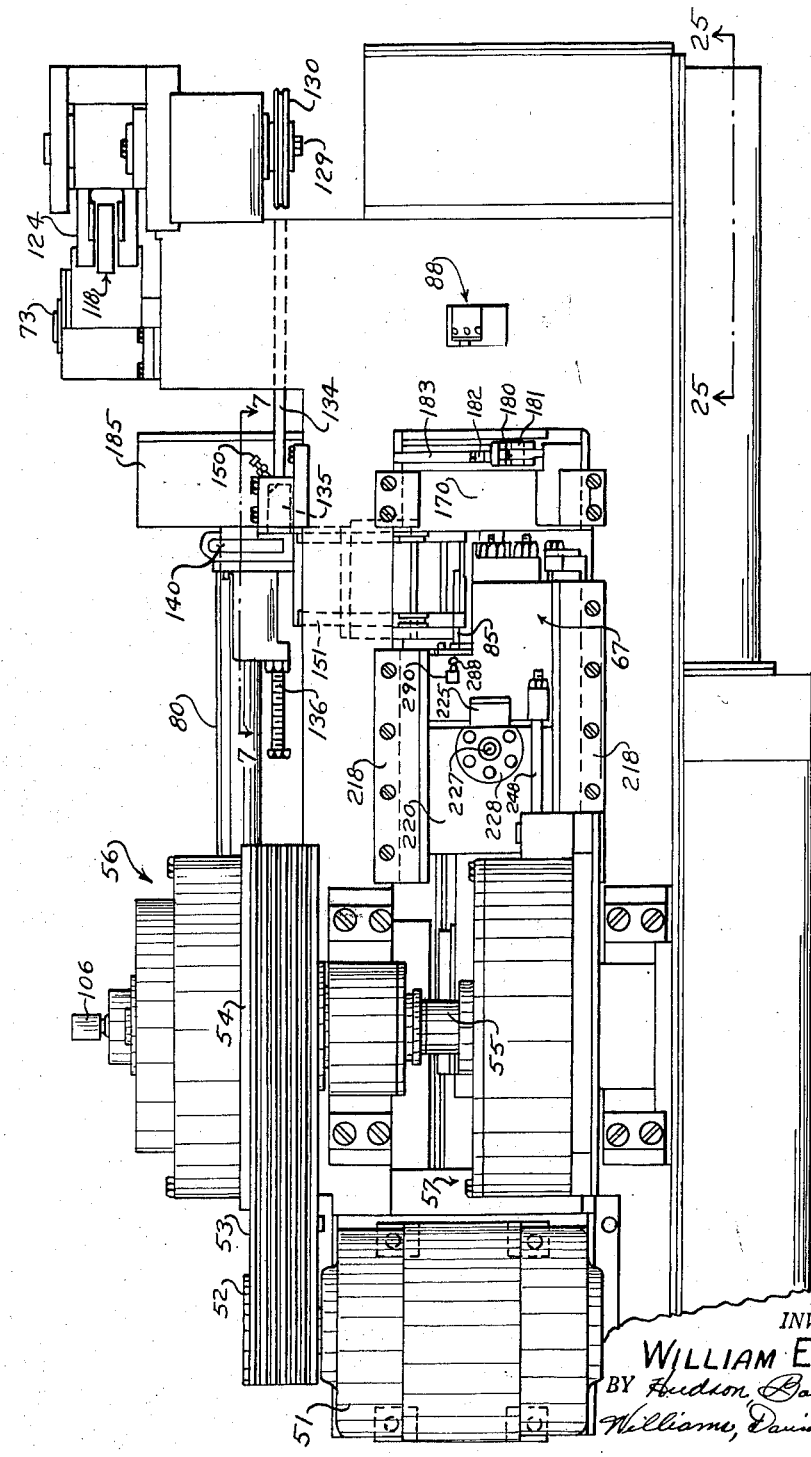
Fig. 1 is a top plan view of a machine constructed in accordance with this invention with certain parts omitted and others shown only in outline to aid in illustration of the general assembly.
Figure 9:
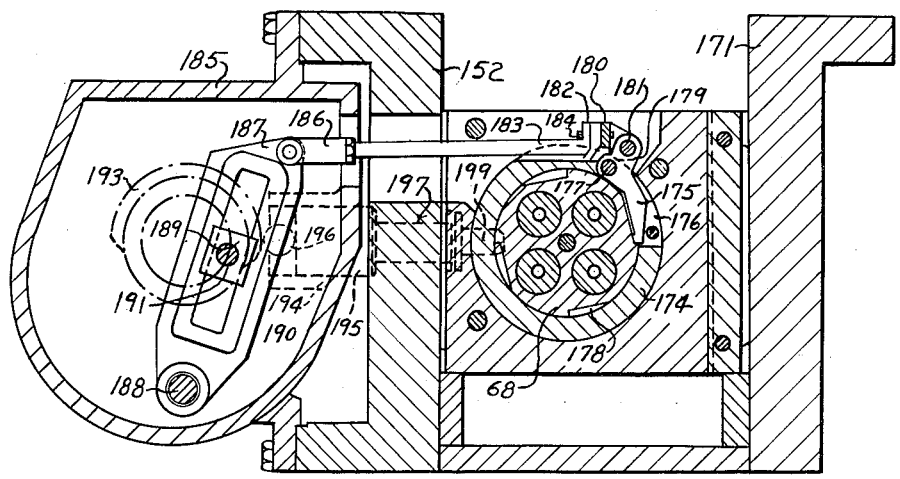
Figure 10:
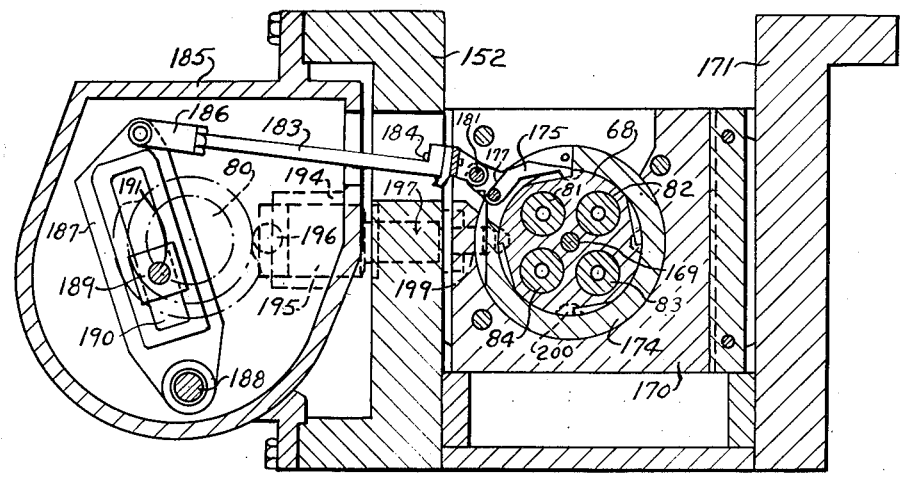
Figure 11:
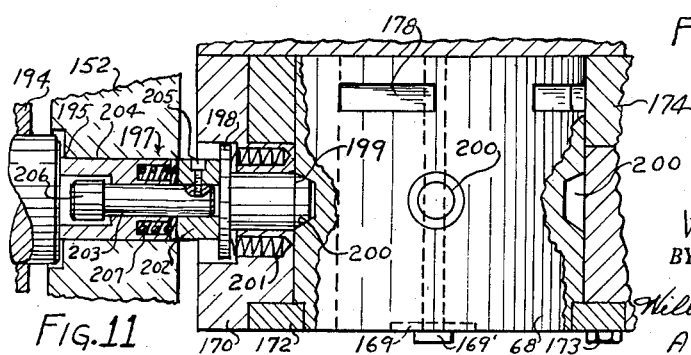

Fig. 9 is a transverse sectional view taken substantially on the section indicating line 9—9 of Fig. 7 and also showing the die support, the die support indexing mechanism being illustrated in the position corresponding with the completion of an indexing movement of the die support and the die locking means being superimposed in broken lines to indicate its cooperative relationship with the die support at the end of the indexing operation;

Fig. 10 is a view similar to Fig. 9 but showing the parts at the beginning of a die support indexing operation;

Fig. 11 is a fragmentary detached view, partially in section and partially in top elevation, illustrating the die support and the locking means therefor;

Fig. 12 is detached rear elevational view of the stock feeding mechanism;

Fig. 13 is a detached side elevational view of the stock feeding mechanism as seen from the right-hand side of Fig. 12;

Fig. 14 is a detached end view of the adjusting arm of the stock feeding mechanism with parts of the housing for the drive thereof broken away to more clearly show the construction;

Fig. 15 is a detached, longitudinal sectional view of the adjustable arm shown in Fig. 14, the section being taken on the section indicating line 15—15 of that figure;

Fig. 16 is a detached, front elevational view of the stock cut-off mechanism and of the feed chute or magazine for receiving the blanks and delivering the latter sequentially into axial alignment with the die;

Fig. 17 is a detached, transverse sectional view through the stock cutting or shearing mechanism and showing the position occupied by the parts upon completion of a shearing operation, the back-up finger which prevents bending of the blanks being shown raised to its inoperative position;

Fig. 18 is a fragmentary, top elevational view of the stock back-up finger and the shearing mechanism;

Fig. 19 is a fragmentary, sectional view through the shearing structure, the view being taken substantially on the section indicating line 19—19 of Fig. 18;

Fig. 20 is a fragmentary, top plan view of the stationary die of the stock shearing mechanism illustrating the manner in which the die may be adjusted in an axial direction;

Fig. 21 is a detached, top plan view of the forward portion of the slide which carries the upsetting punches, the die support being schematically indicated adjacent thereto and the guide ways for the slide broken away;

Fig. 22 is an enlarged, longitudinal sectional view through the forward end of the slide, substantially on the irregular section indicating line 22—22 of Fig. 21, illustrating the longitudinal adjustment of the slide with one pair of upper and lower guideways also being shown;

Fig. 23 is a front elevational view of the forward end of the slide showing the manner in which the punches are mounted thereon, the figure being rotated 90° counterclockwise from the normal position of the parts of the machine;

Fig. 24 is an enlarged fragmentary, transverse sectional view substantially on the section indicating line 24—24 of Fig. 23 showing the manner in which the punches are adjusted and locked in place;

Fig. 25 is a fragmentary, sectional view taken substantially on the section indicating line 25—25 of Fig. 1 showing the drive for the stock feeding and blank removing mechanisms;

Fig. 25 is a fragmentary, sectional view taken substantially on the section indicating line 25—25 of Fig. 1 showing the drive for the stock feeding and blank removing mechanisms;

Fig. 26 is a top view of the right-hand portion of the machine, as viewed in Fig. 1, with certain parts broken away and others shown in section, to more clearly illustrate the drive for the blank removing means;

Fig. 27 is a detached, transverse sectional view taken substantially on the line 27—27 of Fig. 26 and showing the brake and back-up preventing pawl for the crankshaft of the blank removing means;

Fig. 28, Sheet 11, is a detached, transverse sectional view through the drive pinion and the unidirectional clutch of the drive for the blank removing means, the stationary cam mounted on the machine frame for operation of the overrunning preventing pawl also being shown;

Fig. 29, Sheet 10, is a sectional view taken substantially on the line 29—29 of Fig. 26 and also showing the reciprocating member of the blank removing means inserted in a die of the die support;

Fig. 30 is an enlarged view of a portion of Fig. 29 with additional parts broken away to show the details of the blank removing or knock-out member;

Fig. 31 is a transverse sectional view through the knock-out or blank removing member substantially on the section indicating line 31—31 of Fig. 30 and further illustrating the construction of the member;

Fig. 32, Sheet 8, is a fragmentary, sectional view of the blank removing or knock-out member showing the positions occupied by the parts thereof when the shear pin therein has been broken as the result of a blank being jammed in a die or other occurrence requiring excessive force by the removing member;

Fig. 33, Sheet 7, is an enlarged, detached, fragmentary side elevational view of a portion of the machine as seen from the side illustrated in Fig. 3, portions of the machine being broken away at this location to show the position of the discharge chute;

Fig. 34, Sheet 11, is a fragmentary, front elevational view of the die support or holder and dies with the latter numbered to indicate the sequence of the operations performed by the machine at the thus numbered locations or stations;

Fig. 35 is a fragmentary, sectional view taken substantially on the section indicating line 35—35 of Fig. 24 and showing the first and fourth steps in a cycle of operations of the machine; namely the introduction of a blank into a die and the simultaneous discharge of an upset blank from another die during movement of the slide in one direction;

Fig. 36 is a fragmentary, sectional view taken substantially on the section indicating line 36—36 of Fig. 34 and showing the second and third steps in a cycle of operations of the machine; namely, coning a blank in one die and simultaneously completing the upsetting of a previously coned blank, the slide being shown as retracted after these operations;

Fig. 37 is a detached, front elevational view of the die support with a means adjacent the discharge station for sensing the presence of a blank in the die;

Fig. 38 is an enlarged, fragmentary view of the feed finger for the machine and showing the manner in which this member is mounted for axial movement relative to the slide upon encountering excessive resistance to its operation, a means also being illustrated to operate an electrical switch in response to such relative axial movement;

Fig. 39, Sheet 3, is a transverse sectional view through cam-operated electrical switching means driven in timed relationship with operation of the machine, the view being taken substantially on the section indicating line 39—39 of Fig. 3;

Fig. 40 is a schematic representation of the duration of closing and opening, respectively, of the contacts of the switch means shown in Fig. 39, the lower portion of the figure including a legend by which the representations of the contact operations can be readily determined; and Fig. 41 is a simplified schematic electric wiring diagram of a suitable control circuit for the machine.

Referring first to Figs. 1 through 4 of the drawings, it would be seen that a heading machine embodying the principles of this invention comprises a base 50 formed of steel plates, angles, and the like suitably secured together to provide the support for the machine and a reservoir for lubricating liquid such as oil. Adjacent one end of this base is supported an electric motor 51, constituting the main power source for the machine, with its output pulley 52 connected by a flexible drive, such as a plurality of V-belts 53, to a pulley 54. The pulley 54 is freely rotatable on a main drive shaft 55 which is rotatably supported in suitable bearings carried by the frame of the machine. As hereinafter described, the pulley 54 is adapted to be connected with the shaft 55 for rotation of the latter under control of a power-operated clutch 56, see Fig. 6, and simultaneously therewith a brake 57 upon the drive shaft is disengaged. When it is desired to stop the machine, the clutch is disengaged and the brake reengaged, thereby preventing coasting or overrunning due to inertia of the parts.

The main drive shaft 55 has a pinion 58 connected thereto which is in continuous mesh with a large daimeter gear 59 that is keyed to one end of the main crankshaft 60 of the machine, see Fig. 6. Intermediate its ends, the crankshaft 60 is rotatably supported by suitable bearings 61 and 62 in spaced longitudinally extending walls 63 and 64 of the frame and between these walls, the shaft 60 is provided with an eccentric 65. A crankarm 66 is connected at one end to the eccentric and the other end of this arm is operatively connected with a slide 67 for reciprocating the latter towards and from a rotatable die support 68, see Figs. 8–10 and 34–36, in which the blanks to be upset are received and held during the upsetting operation performed by the punches on the slide.

Figure 2:
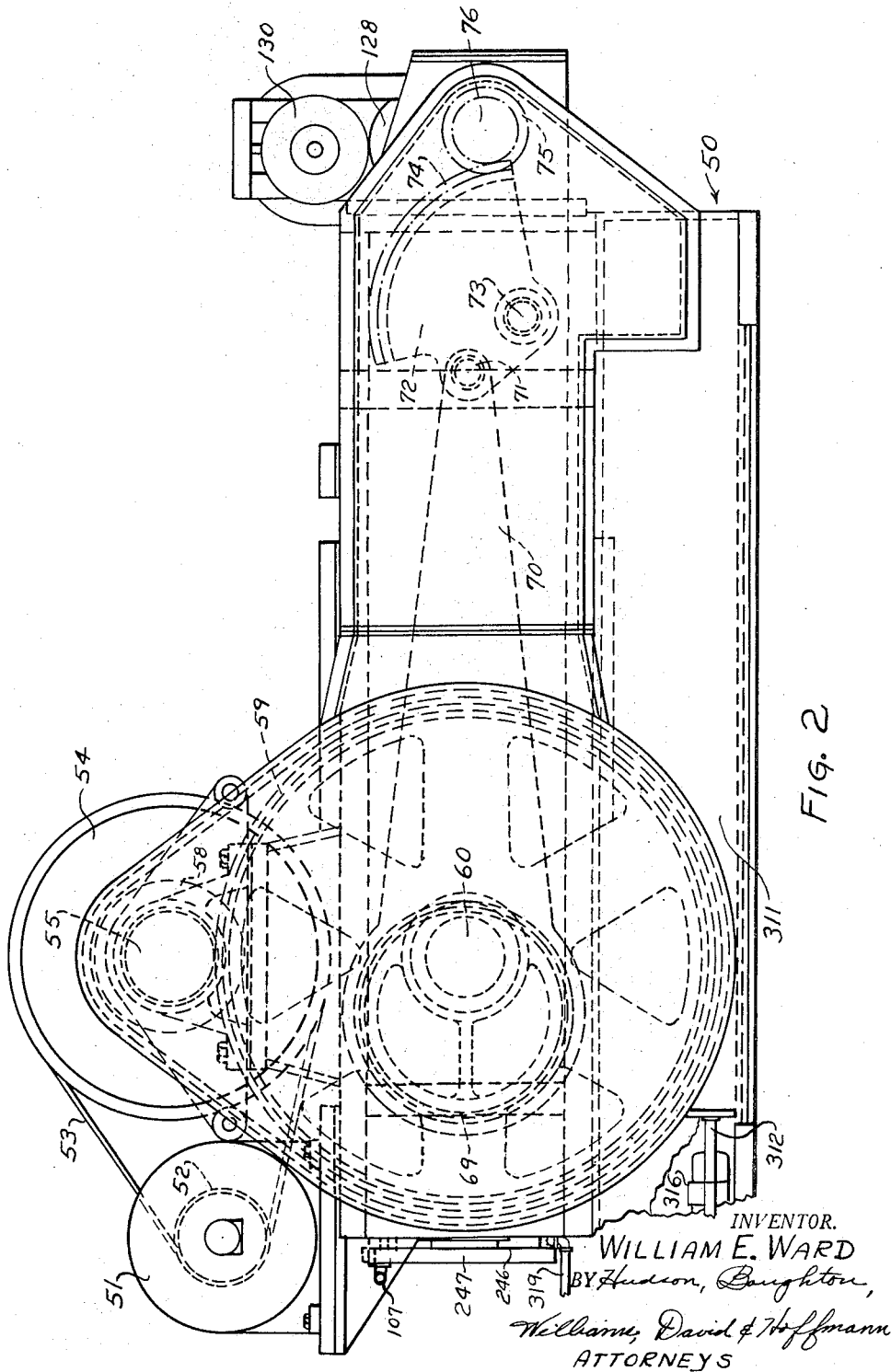
Fig. 2 is an elevational view of one side of the machine with certain parts omitted and others shown only in outline.

The gear 59 has an axially extending eccentric portion 69 thereon, see Fig. 6, which receives one end of an elongated crankarm 70, see also Fig. 2, the other end of which is pivoted at 71 to a gear sector 72 that, in turn, is connected to a transversely extending shaft 73. The shaft 73 is rockably supported in suitable bearings carried by the frame of the machine and extends transversely thereof to the opposite side where, as hereinafter described, it is operatively connected to mechanism for effecting feeding of stock from which the blanks to be upset are formed. The teeth 74 of the gear sector 72, see Fig. 25, mesh with a pinion 75 operatively connected with a crankshaft 76 through a one-direction clutch 77, see Fig. 28. The crankshaft 76 extends transversely of the machine frame and is connected with a reciprocating member for removing the headed blanks from the dies.

The end of the crankshaft 60, on the other side of the machine from the gear 59, is provided with a miter gear 78 which meshes with a cooperating miter gear 79 secured to the end of a shaft 80. The shaft 80 extends longiudinally of the machine frame and, as will be hereinafter described, is provided with driving connections for indexing the die support, locking the latter against rotation and severing the elongated stock into workpieces or blanks of predetermined length. These blanks are then guided to the dies in the die support by a feed chute or magazine, see Fig. 16, and are sequentially introduced in the dies by a feed finger 85 carried by the slide 67.

Before entering upon a detailed description of the mechanisms thus briefly described, it is believed an understanding of the operation of the machine will be facilitated by consideration of Figs. 34, 35 and 36. In Fig. 34, the die support 68 is indicated as being provided with four cylindrical dies 81, 82, 83 and 84 which are identical and each provided with an axially extending opening such as 81a, the outer end of which is enlarged or countersunk, as will be apparent from Figs. 35 and 36. These dies are adapted to sequentially occupy each of four stations spaced 90° from each other and designated, respectively, by the numerals 1, 2, 3 and 4 in Fig. 34, the dies being moved to these positions or stations in timed relationship with the reciprocation of the slide, locking and unlocking of the die support, cutting and feeding of a blank and removal of a completed blank.

As indicated in Fig. 35, when the slide 67 moves towards the die support, the feed finger 85 carried thereby engages a blank B and moves the latter partly into the die at station 1, the maximum depth to which the blank may enter the die being determined by a movable gauging pin such as 86 which is slidable within the bore of the die and is limited in its rearward movement by an anvil plate 87 that extends transversely of the die support.

During this movement of the slide towards the die support, a completed blank B2 is removed from the die at station 4 by an axially reciprocating blank removing or knock-out member, generally designated 88, and which includes an elongated portion or pin 89 that enters the rear of the die at station 4 and displaces the completed blank therefrom, the gauging pin 86, however, remaining in the die.

The movement of the slide towards the die support, and which results in introduction of a blank at station 1, also produces upsetting operations on blanks previously fed to the dies and which are now disposed at stations 2 and 3. This is accomplished by virtue of the slide 67 being provided with punches 90 and 91, respectively, axially aligned with the dies at stations 2 and 3 for cooperation with the blanks in those dies. As here shown, the punch 90 is of the coning type and, when it engages the protruding end of the blank B, it completes introduction of the blank into the die until the inner end of the latter is in metal-to-metal contact with the anvil plate 87 through the gauging pin 86. When thus positioned, the outer end of the blank will protrude from the die, such as 82, and hence the latter part of the slide movement towards the die causes the punch 90 to cone this protruding outer end, as indicated for the blank B1 in Fig. 36, which figure, however, shows the slide retracted from the die after the operation has been completed.

The punch 91 is so designed that it engages a previously coned blank B1 completing the upsetting to provide a head of the form indicated on the blank B2 and, since the punches 90 and 91 are both carried by the slide 67, the two blanks are simultaneously worked upon during the single stroke of the slide. The die support is indexed 90° while the slide is retracted from the dies and the operations repeated as the slide again moves forwardly. Hence, on each reciprocation, a new blank is introduced into a die at station 1, a previously fed blank is seated in the die and coned at station 2, the upsetting of the previously coned blank is completed at station 3, and the previously completed blank B2, which is now at station 4, is discharged. Consequently, upon each reciprocation of the slide, a headed blank is delivered from the machine.

As mentioned heretofore, the main shaft 55 has the drive member or pulley 54 freely rotatable thereon. This drive member or pulley is connected with the driven member or shaft 55 by engagement of the clutch 56 which is here illustrated as being of the pneumatically-operated, electrically-controlled type. In the form shown, the housing 92 of the clutch is connected with the driving member or pulley 54 for rotation therewith and a portion of the interior periphery of the housing member is provided with one or more keys or teeth 93 which engage friction members, such as 94 and 95, and prevent the latter from rotating. Intermediate the friction members 94, 95 is a substantially disc-shaped member 96 which is connected to rotate with the shaft 55 by means of one or more keys 97 carried by the shaft. The friction member 95 is located between one portion of the housing 92 and the disc-like member 96 while the other friction member 94 is between the member 96 and the annular face of an axially movable piston 98. The piston 98 is normally urged to a position preventing force transmitting engagement between the several members of the clutch, that is to the left as viewed in Fig. 6, by one or more coiled springs 99 acting upon bolts or studs 100 connected with the piston and extending externally of the housing 92.

Fluid for operating the clutch 56, which in the present instance is air under pressure, is supplied to the housing 92 from a suitable source of supply through a conduit 101, see Fig. 4, connected with the inlet of a solenoid control valve 102, the outlet of which is connected to the clutch housing through a T 103, conduits 104, 105, and a conventional coupling 106 that permits relative rotation between the parts thereof. The T 103 is also connected through conduits 107, 108 and 109 to the interior of the fluid operated brake 57.

The brake 57 comprises a housing 110 in which a piston 111 is slidably supported and is normally held in firm engagement with a friction member 112 by means of a plurality of coil springs 113 acting between the piston and a wall of the housing. The friction member 112 is secured against rotation relative to the housing 110 by engagement with one or more teeth or keys 114 provided therein. The friction member 112 engages a friction member 115 which is adapted to rotate with the shaft 55 by being keyed to a member 116 which is rotatable therewith. Intermediate the member 115 and the outer wall of the housing 110, which wall is formed by a detachable plate, is a second friction member 117 keyed to the housing 110 in the same manner as the friction member 112. It will be apparent, therefore, that the springs 113 act to frictionally engage the members 112, 115 and 117 thereby preventing rotation of the shaft 55. However, when fluid pressure is supplied through the conduits 107, 108 and 109 to the housing 110 it acts upon the piston in the direction moving the latter against the force of the springs 113 thereby permitting relative rotation between the friction members so that the shaft 55 may be rotated, it being remembered that the same fluid pressure which releases the brake also acts through the conduits 104 and 105 to engage the clutch and provide a driving connection from the pulley 54 to the shaft 55.

As mentioned heretofore, the valve 102 is electrically controlled and during normal operation of the machine is maintained in open position so that the clutch is engaged and the brake released. However, as will be hereinafter described, the valve 102 is connected in a control circuit that includes a plurality of switches such that misalignment of a blank during feeding, failure of a blank to be discharged at station 4, or failure of sufficient oil pressure to lubricate the machine, will automatically result in closing of the valve 102 thereby terminating the supply of air pressure to the clutch and brake so that the clutch is disengaged and the brake engaged by the springs of the respective mechanisms. The machine may also be conditioned so that it will perform one cycle of operations and automatically come to a stop or it can be made to operate only when a manually operated start button is actuated. The electrical circuit by which these controls are effected are schematically represented in Fig. 41 which will be hereinafter described in detail.

The stock from which the bolts are to be formed is normally supplied in the form of coils or elongated pieces of rods having a suitable diameter. This rod or stock is severed or sheared by the machine into pieces of predetermined length to provide the blanks upon which the machine operates, the feeding and shearing being effected in timed relationship with the other operations of the machine. Thus, as has been mentioned heretofore, the main drive shaft 55 operates through the pinion 58, gear 59, eccentric 69, crankarm 70 and sector 72 to sequentially rock the shaft 73 in opposite directions. This rocking movement of the shaft 73 effects feeding of the stock from which the blanks are cut.

Referring now to Figs. 12 to 15, it will be seen that the end of the shaft 73, on the side of the machine opposite the gear sector 72, has a composite arm 118 connected thereto for rocking movement therewith. This arm 118 comprises a radially extending portion having a substantially U-shaped configuration in which a clevis 119 is supported for movement lengthwise of the arm. Thus, as will be evident from Figs. 14 and 15, the lower portion of the clevis 119 is tapped and has a threaded shaft 120 extending therethrough, which shaft is rotatively supported but held from axial movement upon the arm 118 intermediate the sides thereof. One end of the shaft 120 extends beyond the supports therefor and is provided with a polygonal surface 121 by which it may be engaged and rotated for adjusting the position of the clevis 119 longitudinally of the arm.

The spaced, upstanding portions of the clevis 119 receive therebetween one end of a connecting link 122, the link being pivotally connected to the clevis by a pin 123 carried in aligned bores in the spaced portions of the clevis. The other end of the link 122 is pivotally connected to a radially extending arm 124 by means of a pin 125 which is adapted to be received in one or two openings spaced radially along the arm 124. The arm 124 is connected with a unidirectional, overrunning clutch 126 of conventional construction which, therefore, need not be illustrated in detail, and this clutch is, in turn, connected for operation of a shaft 127 journalled in suitable supports on the frame of the machine and provided at its opposite end with a stock-engaging and driving grooved wheel 128.

Vertically above the shaft 127 is journalled a second shaft 129 extending parallel with the shaft 127 and provided with a grooved stock-engaging wheel 130 in vertical alignment with the stock-engaging wheel 128. The stock-engaging wheel 130 is adapted to be driven in reverse direction with respect to the wheel 128 by a gear 131 connected to the shaft 129 and meshing with a gear 132 secured on the shaft 127. The force exerted upon the stock by the stock-engaging and driving wheels 128 and 130 may be adjusted by means of an adjusting member 133 which is connected to the bearings for the shaft 129 and is adapted to move the latter vertically relative to the frame upon rotation of member 133.

The elongated stock from which the blanks are cut is supplied to the machine from a suitable reel or other mechanism, not shown, and the stock is received between the grooved members or wheels 128 and 130 which are adjusted by virtue of the member 133 to grip stock with a sufficient force that it is fed between the members when the latter are rotated. During normal operation of the machine, the feed drive shaft 73 is rotated alternately in opposite directions. Consequently, the adjustable arm 118 rocks arcuately and this rocking motion is transmitted through the link 122 and the arm 124 to the clutch 126. Since this clutch is of the unidirectional type, movement of the arm 124 in the clockwise direction, as viewed in Fig. 13, rotates the shaft 127 thereby driving the feed wheels 128 and 130. Hence, the stock is moved forwardly through a hollow guide tube 134 and stationary die 135, see Figs. 1 and 20, into engagement with the end of an adjustable stock stop 136, see Figs. 1 and 7. The length of the blanks is determined by the distance between the end of the stationary die 135 and the adjacent end of the adjustable stock stop 136 and when the stock has engaged the stop 136, the clutch 126 permits relative rotation between the shaft 127 and the arm 124 should the latter continue to move by virtue of its connection with the shaft 73. When the shaft 73 is rotated in the reverse direction, the clutch 126 allows the arm 124 to be oscillated back to its initial position, substantially that shown in full lines in Fig. 13, without rotation of the shaft 127 and hence the stock feeding wheels or pulleys 128 and 130 remain stationary with the result that the stock is fed only in the forward direction. If desired, a friction brake may be provided upon the shaft 127 to prevent overrunning thereof as well as to prevent any tendency to rotate in the reverse direction.

Means are provided for adjusting the extent of arcuate movement of the arm 124 to thereby vary the distance the stock is fed forwardly upon each rotation of the shaft 73 in the stock feeding direction. For this purpose, the arm 124 is provided with a pair of radially spaced openings each adapted to receive the pivot pin 125 for the lever 122. This provides for large adjustment in the length of the stock feed, the inner of the openings being employed when the length of the blanks is to be relatively long, as for example in the order of 8", while the pivot pin 125 is inserted in the outer hole when shorter blanks are to be cut, as for example blanks in the order of 4" in length. A finer adjustment of the length of the stroke of the arm 124 is provided by adjustment of the clevis 119 radially of the arm 118 through rotation of the adjusting screw 120. In this regard it will be observed that the axis of the pivot pin 123 is offset from the axis of the adjusting shaft so that a wider range of adjustment is provided for a given length of movement of the clevis than would be the case if the pivot pin axis were movable along the axis of the adjustment shaft. These adjustments assure proper driving action of the stock feeding wheels 128 and 130 for a given length of stock so that the latter is firmly engaged and held in engagement with the stationary stock stop 136 without striking the latter with sufficient force to cause rebound. As noted above, the stop 136 is adjustable to accommodate the different lengths of blanks which are to be formed.

A means for shearing the stock which is fed by the feeding means just described is provided for cooperation with the stationary die 135. In the illustrated embodiment, this stock cut-off or severing means comprises a member 137 which is supported for reciprocation transversely relative to the stationary die 135. The member 137 has a recess adjacent the top thereof on the face thereof adjacent the die 135 in which a shearing blade 138 is removably supported. The member 137 is connected with a crankarm 139 which is actuated by an eccentric 139' provided on the shaft 80 that extends longitudinally of the machine and is driven from the crankshaft 60 by the miter gears 78 and 79. The stock feeding mechanism is also driven, as above described, from the crankshaft 60 and, consequently, the operation of the stock feeding device is in timed relationship with the reciprocation of the slide 137.

It has been found that the shearing of cylindrical stock, of the diameters normally employed in forming bolts, by means of a shear member engaging the stock from only one side thereof, frequently results in a bending of the severed portion especially adjacent the region at which it is severed, thereby causing difficulties in feeding the blanks and/or jamming of the blanks in the heading machine as well as in machines which operate upon the blanks substantially to the action of the heading machine. In accordance with this invention, such bending of the stock is prevented by providing a means which resiliently engages the stock on the side opposite that on which the shear is acting, thereby maintaining the projecting portion of the stock substantially parallel with the main portion during the shearing operation. In the preferred embodiment this means comprises a lever 140 which is pivoted to a stationary portion of the housing for the shearing mechanism and has the forward arm engaging the upper surface of the bar stock which projects from the die 135. The other end of the lever 140 is engaged by a plunger 141 which is urged upwardly by a spring 142 so that the lever 140 is continuously urged in a clockwise direction as viewed in Figs. 16 and 17. Movement of the lever 140 in this direction is limited, when the slide 137 is at its lowermost position, by a suitable abutment surface on the lever support adjacent the pivot therefor. The position of this abutment is such that the lever 140 extends partially in the path of stock emerging from the die 135 and hence the lower edge of the lever is bevelled, rounded or otherwise relieved, as indicated at 144 in Fig. 19, so that the stock emerging from the die 135 operates with a cam action upon the lever 140. This insures proper engagement of the lever 140 with the stock before the initial engagement of the shear blade therewith and this engagement is continued throughout the shearing operation with the force exerted by the lever 140 upon the stock increasing as the shearing action progresses thus offsetting the increased tendency of the portion of the stock being severed to bend.

When the slide 137 has moved upwardly sufficiently to completely sever the portion of the stock projecting from the die 135, a camming surface 145 on the reciprocating member 137 engages the lever 140 thereby relieving the severed stock of the force which was exerted thereon by the lever during the severing operation. This frees the severed portion of the stock, which may be termed a blank, and the latter may then move by gravity from the shearing mechanism since the member 137 and the shear blade 138 are disposed at an angle to the horizontal as will be apparent from Figs. 16 and 17. The shearing edge of the blade 138 is customarily semicircular and in order to facilitate movement of the severed blank from this surface, the member 137 is provided with a plunger 146 which is slidable along the shear blade 138 and normally tends to extend thereabove by virtue of a compression spring 147. The upper corner of the plunger 146 adjacent the shear blade 138 is relieved, as indicated in Fig. 19, so that when the stock is fed through the die 135 it will engage the sloping surface on the plunger 146 forcing the latter downwardly and permitting the stock to pass thereabove. The plunger 146 thereafter continuously acts upwardly upon the stock but the force exerted by the spring 147 is materially less than the force exerted by the lever 140 so that the backing action of the latter is not materially affected. However, when the lever 140 has been engaged by the surface 145 of the slide, the spring 147 is then operative to elevate the blank above the semicircular recess of the shear blade so that the blank can then roll by gravity therefrom.

In order to facilitate sharpening of the shear blade and/or replacement of parts the blade, the plunger 146, and the spring 147 are supported in a block 148 which is removably secured in a recess at the upper portion of the slide 137 as by means of screws 149 or the like. Consequently, by removal of the screws 149, the block 148 together with the shear blade 138, plunger 146 and spring 147 may be removed as a unit. The die 135 likewise is removable and may be replaced by other dies of suitable bore for the diameter of the stock to be handled. The position of the forward end of the die relative to the face of the stationary member on which the shear blade 138 reciprocates may be adjusted by means of an adjusting bolt 150 which is threaded through an inclined tapped opening of the frame adjacent the die with the inner edge of the bolt 150 engaging an inclined surface at the rear of the die 135 as shown in Fig. 20.

The blanks severed by the shearing mechanism, just described, move by gravity into an inclined feed chute or magazine, designated generally as 151, and which has a stationary portion supported upon a wall member 152 of the frame of the machine, this portion of the feed chute or magazine extending through an opening in the wall. The feed chute or magazine 151 is adapted to receive the blanks in side-by-side relationship with their axes extending parallel to each other and to the axes of the dies into which they are to be fed. The blanks are maintained in this relationship as they move through the chute or magazine by virtue of longitudinally extending bars 153 which are secured to the side walls 154 of the magazine or chute and spaced upwardly from the bottom of the chute a distance slightly greater than the diameter of the blanks moving therethrough.

The lower portion of the chute or magazine 151, which extends adjacent the upsetting dies, is adjustable to secure alignment of blanks of different diameters with the opening such as 81a in the die at station 1. In this portion of the magazine, the bottom members 155 thereof are connected to substantially triangularly-shaped plates 156 which are joined to a transversely extending member 157, and to a vertically extending plate 158 which is removably secured to a vertical member 159 by a suitable bolt or the like. The member 159 is fastened to the frame side wall 152 and this member 159 carries a bar 160 the upper edge of which is notched to slidably receive the lower edge of the plate 158. The lower portion of the plate 158 is bifurcated or provided with an opening through which extends a bracket or lug 161 that is secured to the member 159. A threaded adjusting member 162 extends through an opening in the transverse member 157 and is threaded into a tapped opening of the bracket or lug 161, a compression spring 163 being provided between the member 157 and the bracket or lug 161.

The lower or forward edges of the bottom members 155 of the chute or magazine are provided with a portion 164 extending perpendicularly therefrom, thereby providing a substantially V-shaped surface on which the lowermost blank in the magazine rests in alignment with the opening in the die at this station. Adjustment of the members 155 and the portion 164 to provide proper alignment with the dies for blanks of different diameters is effected by adjusting the member 162, thereby moving the members 155 and the portion 164 vertically. The plate 158 slides relative to the plate or member 159 during this adjustment and thereafter is clamped in the adjusted position by tightening of the nut 165 which secures the plate 158 to the plate 159, it being noted that the plate 158 has an elongated slot for receiving the shank of the bolt carried by the member 159 and to which the nut 165 is secured. The alignment of the V-shaped surface, provided at the lower end of the magazine 151, horizontally relative to the axis of the die at station 1 of the machine is effected during initial assembly of the apparatus by accurate machining of the parts and the use of shims or the like and thereafter need not be altered when blanks of different diameters are to be used in the machine. Consequently, adjustment of the feed magazine 151 for accommodating blanks of different diameters requires only that the bars such as 153 be spaced from the lower members of the magazines the proper distance and that the adjusting member 162 be rotated to move the lower portion of the magazine vertically as just described.

The upper portion of the forward end of the magazine comprises side members 166 and longitudinally extending members or bars 167 that are secured to the side members and spaced from the lower members 155 to permit passage of the blanks therebetween. The side members 166 and the bars 167 of this portion of the feeding magazine or chute are pivoted to the stationary portion of the magazine by means of a transversely extending rod or shaft 168. Hence, the magazine may be readily moved from its position in advance of the dies, when it is desired to remove the latter, by swinging the upper portion of the magazine about its pivot and removing the lower portion of the magazine through removal of the adjusting member 162 and nut 165. Upon replacement of the parts, the proper alignment is readily secured by adjusting only the member 162 after which the parts are secured in proper position by tightening the nut 165.

The dies 81, 82, 83 and 84 each has a sliding fit in separate axially extending openings in the substantially cylindrically-shaped die support 68 which is rotatable in a block 170 that is suitably supported between the side walls 152 and 171 of the frame, see Figs. 9, 10 and 34 to 36. The rear surfaces of the dies and of the die support are adapted to engage the stationary anvil member 87 which is secured to the block 170 and hence is stationarily supported in the frame. The forward portion of the die support has a reduced diameter portion providing a shoulder which is engaged by an annular retaining member 172 which is secured to the block 170 by a plurality of socket head screws 173. Consequently, the die support is prevented from axial movement while being free to rotate within the block 170. The dies are held against axial movement forwardly of the die support by a polygonal plate 169 engaging the forward ends of the dies and held in place by a screw 169' which is received in a tapped central bore in the die support 68. The dies may be readily removed by removing the screw 169' and plate 169 after which the dies may be axially pushed from the die support. To facilitate this removal, a rod R is supported for movement through aligned openings in the frame members and the anvil member or plate 87, see Figs. 29 and 30. This rod is normally retracted from the die support to permit free indexing thereof but may be moved forwardly to thrust a die from its support when the die is aligned with the rod and the plate 169 has been removed.

Surrounding the rear portion of the die support 68 is an annular member 174 which is rotatable relative to the die support and the die block 170 and has a pawl 175 received within a circumferentially extending slot 176, see Figs. 9 and 10. The rear of the pawl 175 is pivoted to the annular member 174 by a pivot pin 177 and the forward end or nose of the pawl is adapted to cooperate with spaced notches, such as 178, provided in the periphery of the die support 68, the number and spacing of the notches 178 corresponding to the number and spacing of the dies. The pawl 175 also has a laterally extending ear 179 which is pivoted between the legs of a substantially U-shaped member 180 by means of a pivot pin 181, see also Fig. 1. The transverse portion of the U-shaped member 180 is connected to an upwardly extending portion 182 of an elongated thrust member 183 by a bolt or the like 184. The thrust member 183 extends through an opening in the wall 152 of the frame and into a housing 185 secured thereto. Within the housing 185 the thrust member 183 has a bifurcated portion 186 which is pivoted to the upper end of a slotted arm 187, the lower end of which is pivoted to the housing 185 by a pin 188. A block 189 is slidably mounted within the slot 190 of the lever or arm 187 and this block is pivoted to a pin 191 carried by a member 192 which is connected with the shaft 80 for rotation therewith, see Figs. 7 and 8.

The construction just described is such that rotation of the shaft 80 moves the pin 191 through a circular path, as indicated in broken lines in Figs. 9 and 10, thus causing the block 189 to slide within the slot 190 and this in turn produces rocking movement of the arm 187 about the pivot 188, the limits of this movement being substantially between the two positions shown in Figs. 9 and 10. When the parts are in the position shown in Fig. 10, the pawl 175 is engaged in a notch 178 and, hence, as the arm 187 rocks clockwise, the die support 68 is rotated clockwise. The dimensions of the parts are such that the rocking of the arm 187 in this direction rotates the die support and its dies 90° from the position shown in Fig. 10 to that shown in Fig. 9. During the remainder of the revolution of the shaft 80, the arm 187 rocks counterclockwise to its initial position and the pawl 175 moves from the notch 178, the die support 68 remaining stationary by virtue of engagement therewith of a locking means, about to be described. Since the pawl 175 is connected to the annular member 174, this return movement of the pawl 175 rotates the annular member relative to the die support until the pawl 175 is positioned for cooperation with the next succeeding notch 178 and which corresponds to the position of the parts as indicated in Fig. 10.

It will be evident, therefore, that the die support and dies are sequentially indexed through an arc of 90° upon each rotation of the shaft 80, which rotation corresponds with one complete cycle of operations of the machine. Adjustment of the extent of movement of the thrust member 183, and of the cooperation of the pawl 175 with the die support, can be effected by forming the thrust member 183 separate from the bifurcated portion 186 and providing a threaded connection therebetween so that the overall length of these parts may be varied. Also the pivot pin 188 is preferably provided with a cylindrical portion upon which the arm 187 rocks, which portion is eccentric with respect to the axis of the portion of the pin secured in the housing 185, thereby permitting longitudinal adjustment of the arm 187 by rotation of the pin 188. Overtravel of the die support is prevented by spring loaded brake shoes, not shown, which are in constant engagement with the die support and retard its rotation.

The above-mentioned sequential locking and release of the die support is effected in timed relationship with the indexing movement by means of a cam surface 193 provided around the periphery of the member 192. This cam surface is shown as a raised portion extending substantially 180° about the periphery of the member 182 and having a radial dimension sufficient to effect movement of a locking member from an inoperative to an operative position. Referring to Figs. 8 to 11, the housing 185 is provided with a hollow boss 194 in which a block 195 is slidable. This block is provided at one end with a cam follower 196 which is adapted to ride upon the surface of the cam 193 while the other end of the block 195 engages a thrust member 197 which is slidable within an opening in the wall 152. The other end of the thrust member 197 engages an enlarged head 198 on a locking member or pin 199, the forward end of which is frusto-conical in shape and adapted to engage sequentially in correspondingly-shaped openings 200 at spaced locations about the periphery of the die support 68, the number and spacing of these openings corresponding with the number and spacing of the dies in the die block.

Intermediate the inner face of the head 198 of the locking member or pin 199 and the adjacent surface of the block 170 in which the pin axially slides are a plurality of compression springs 201 which normally act to retract the member or pin 199 from engagement with the openings 200. The locking member or pin 199 is, however, moved into locking engagement with one of the openings 200 in timed relationship with the indexing of the die support by the action of the cam 193 upon the block 195 and thrust member 197. Therefore, when the cam 193 is engaging the roller 196, the locking member or pin will be engaged in an opening 200 and will be thus positively held so long as the cam 193 is engaging the roller. This corresponds to the portion of the rotation of the shaft 80 during which the arm 187 of the indexing mechanism is moved from the position shown in Fig. 9 to the position shown in Fig. 10 so that during this portion of the operation, the die support and dies are positively held in an indexed position and, as will be hereinafter apparent, it is during this portion of the cycle of operations that a blank is introduced into a die, the previously introduced blanks are upset and an upset blank is removed from a die. When the rotation of the shaft 80 moves the cam 193 from engagement with the roller 196 the springs 201 become effective to force the pin 199 from engagement with the aligned opening 200, thereby releasing the die support for indexing movement which is effected by the arm 187 rocking from the position shown in Fig. 10 to the position shown in Fig. 9 after which the locking pin is again engaged with the die support by operation of the cam 193.

The thrust member 197 is preferably provided with a resilient lost motion to insure proper locking action under predetermined pressure. As shown in Fig. 11, this is accomplished by forming the portion of the member 197, which engages the head 198 of the locking pin separate from the portion which engages the block 195 and providing spring means therebetween. Thus, the forward portion of the member 197 is shown as an annular member 202 secured to the shank of a headed pin 203 which is slidable within a bore in the rear portion 204 of the member 197, the member 202 and the shank 203 being secured by a set screw or the like 205. The head 206 of the pin 203 is disposed in a counterbored opening in the portion 204 and the forward part of the portion 204 is provided with an annular recess in which is disposed a compression spring 207 that engages the rear face of the member 202. The spring 207 is preferably of sufficient strength that it is not appreciably compressed in overcoming the force of the springs 201 when the thrust transmitting member 197 is actuated to engage the locking pin in an opening 200. However, the spring 207 will yield if the locking member be fully seated in an opening before the action of the actuating cam 193 is completed. Also, should the axis of the locking pin not be exactly aligned with the axis of an opening 200 when the cam 193 is active to effect engagement of the locking pin in such an opening, the spring 207 and the frusto-conical end of the pin 199 facilitate entrance of the latter into the opening and produces sufficient arcuate movement of the die support to accurately position the die support and dies in their indexed positions. Consequently, slight inaccuracy in the extent of indexing of the die support does not interfere with the proper operation of the machine. Furthemore, the provision of the spring 207 insures that the locking pin will be engaged in an opening 200 with a predetermined pressure in spite of small variations in the diameters and depths of the openings 200.

The slide 67 is reciprocated towards and from the die support and dies and is guided in this movement between parallel spaced wall portions 208 and 209, see Fig. 21, which may be integral with, or connected to, the wall portions 152 and 171 in which the die block 170 is mounted. As shown in Figs. 1, 21, 22 and 23, the slide 67 is provided on the sides thereof with longitudinally extending bars 210, 211, 212, 213, 214, 215 and 216. The bars 213 and 214 slide upon longitudinally extending guideways provided upon bracket-like members such as 217 secured to the lower portions of the walls 208 and 209, respectively, and the plates 210 and 216 slide upon similar guideways provided by bracket-like members such as 218 connected with the upper portions of the wall 208 and 209. The bars 211 and 212 slide upon suitable surfaces on the inner face of the wall 208 while the bar 215 slides upon the inner surface of the wall 209. If desired, the bar 215 may be adjustably connected to the slide by means of a tapered gib or the like to facilitate proper positioning of the parts for accurate reciprocating movement and the guideways provided by the members 217 and 218 may be adjusted by means of shims or other known expedients to thereby provide for proper reciprocation of the slide without play.

The slide 67 is connected to the crankarm 66 by means of a transversely extending pin 219 and preferably the slide is made in two parts longitudinally adjustable relative to each other to facilitate adjustment of the extent of movement of the punches 90 and 91 carried thereon with respect to the die support and dies. Thus, as will be apparent from Figs. 21 and 22, the rear portion 220 of the slide carries the aforementioned pin 219 connected with the crankarm 66. The forward portion 221 of the slide, which is provided with the punches 90 and 91, is connected with the rear portion by longitudinally extending rods 222 and 223 secured to the forward portion 221 of the slide and extending through openings in the rear portion, the outer ends of the rods being threaded and provided with nuts such as 224 for securing the parts together. Between the forward and rear portions of the slide is positioned a vertically extending, tapered adjusting member 225 adjustably connected with the rear portion 220 and having its inclined forward face engaging a corresponding inclined surface in the back of the forward portion 221.

The adjustable connection of the member 225 to the rear portion 220 of the slide is effected by providing a horizontally extending arm 226 on the member 225 which has a tapped opening in which is threadably received a vertically extending adjusting screw 227. The screw 227 is rotatable relative to the portion 220 but is held from axial movement with respect thereto by a cap member 228 which is secured to the latter and overlies an enlarged portion 229 on the adjusting member. The outer end of the adjusting member or screw 227 may be provided with a polygonal surface or other expedient by which it may be engaged and rotated to change the elevation of the member 225 relative to the slide and thereby alter the separation between the portions 200 and 221. During this adjustment, the nuts 224 will, of course, be loosened sufficiently to permit relative movement between the two portions of the slide and after the desired adjustment has been secured, the nuts 224 are tightened to firmly secure the two parts of the slide together. In addition, the upper end of the adjusting member or screw 227 may be threaded and provided with a locking nut 230 to further insure that the parts will remain in an adjusted position.

The aforementioned lower portion of the blank supplying chute or magazine 151 extends into alignment with the die at station 1 of the machine and at one side of the forward end of the slide 67 which carries the punches 90 and 91, the forward portion 221 of the slide having an offset adjacent the punch carrying portion as indicated in Figs. 1 and 21 to accommodate the chute or magazine. The forward surface of this offset portion of the slide 67 supports the previously mentioned feed finger 85 in alignment with the lowermost blank in the magazine or chute 151 which, in turn, is in alignment with the opening in the die positioned at station 1 of the machine. Consequently, when the slide 67 moves towards the die, the feed finger 85 will engage the lowermost blank in the feed magazine and move the latter axially into the aligned die, as for example, into the die 81 as indicated in Fig. 35.

The length of the dies employed is constant for blanks of all lengths within the capacity of the machine and hence variation in the extent which a blank projects from the die, after it is seated therein, is provided for by the aforementioned gauging pins 86 which are slidable within the opening of the dies and normally remain therein during operation of the machine. Consequently, the extent to which the blanks project from the die is varied by replacing the gauging pins 86, thereby accommodating the machine for forming heads upon blanks of different lengths and/or forming heads of different heights. The extent of reciprocation of the slide for effecting upsetting of the blanks to form heads of the desired height is adjusted, as has been just mentioned, by means of the tapered adjusting member 225.

As has been mentioned heretofore, the punch 90 is preferably of the type for effecting a coning operation upon a blank while the punch 91 is of the type for forming a head from a previously coned blank. It will be evident, however, that it may be desirable to employ pnches of different natures and/or different dimensions to form heads of different types or sizes. Therefore, the punches 90 and 91 are removably supported upon the slide and in addition are universally adjustable within a plane extending at right angles relative to the direction of reciprocation. For this purpose, the punch 91 is slidable within an opening in the punch carrying plate 231, the punch being prevented from axial displacement with respect to the plate by a locking member or screw 232 which extends through an opening parallel with the face of the plate and has a portion engaged in a recess or opening in the side of the punch. The punch 90 is similarly mounted and each of the punch-carrying plates is supported upon a planar surface at the forward end of the slide portion 221 and is movable transversely thereover limited amounts by means of a pair of adjusting and locking members carried by the slide.

Each of these adjusting and locking members is identical and hence only one need be described in detail. As shown in Fig. 24, the slide 231 has a cylindrical opening therethrough, offset from the axis of the punch 91, in which opening is positioned a cylindrical portion 233 of a punch adjusting and locking member, the portion 233 being eccentric with respect to the axis of the member and to a concentric portion 234 which is rotatable in a bore of the forward portion 221 of the slide 67. The inner end 235 of the adjusting and locking member is of reduced diameter and is threaded and engaged in a tapped opening 236 in the slide. Between the portion 233 and its outer end, the adjusting and locking member is provided with another region of reduced diameter which is threaded for the reception of a locking nut 237. The extreme outer end portion of the locking and adjusting member is preferably provided with a polygonal portion 238 for the reception of a suitable wrench or tool by which the adjusting member may be rotated. The construction is such that, by loosening the nut 237 and turning the adjusting member by means of a wrench or tool applied to the surface 238, the eccentric portion 233 will move the punch carrying plate laterally relative to the slide, it being understood that the required adjustment for the punches is of a small value and may be in the order of 1/32 of an inch.

The plate 231 may be adjusted at right angles to the adjustment provided by the adjusting member shown in Fig. 24 by a similar adjusting and locking member 239 which is constructed similarly to that shown in Fig. 24 and is supported on the slide in a position spaced from the adjusting member shown in Fig. 24. The two adjusting members for each plate are preferably located on center lines which extend at right angles to each other and intersect at the center of the punch. The punch 90 is provided with a similar mounting plate in which the punch is locked against axial movement in the same manner as punch 91, the punch 90 and its plate being adjustable and locked in adjusted position by members 240 and 241 identical with those which have been described for the punch 91. It will be apparent, therefore, that each of the punches may be adjusted transversely of the slide through a small amount, the two adjusting members for each plate jointly acting to move that plate in all directions within a plane extending transversely of the slide. After the punches have been thus adjusted, they may be secured in the adjusted position by tightening the lock nuts such as 237.

The height of the head formed upon a blank and the nature of the punches for forming such head are such that portion of the punches extend closely adjacent the faces of the dies at the end of the stroke of the slide 67 in the forward direction. Due to the fact that a certain amount of play is invariably present in the bearings of the crankshaft and crankpin, and because the frame of the machine elongates slightly during the upsetting operation because of the tremendous forces involved, the stroke of the slide 67 must be adjusted so that, if no blanks are present in the dies, reciprocation of the slide might cause engagement of the punches with the dies and injure the latter. In order to prevent such an occurrence, a fluid pressure actuated counterbalance is provided for the slide which tends to take up the play in the bearings and the like and compensate for the stretching of the frame.

This counterbalance is provided by a cylinder 242, see Figs. 4 and 5, which is stationarily connected to the frame at the rear of the slide, as by means of a transversely extending plate 243 having an annular portion 244 surrounding the open end of the cylinder and connected thereto by suitable bolts or the like 245. A piston 246 is slidable within the cylinder 242 and is guided in that sliding movement by the annular portion 244 of the cylinder supporting plate. The piston has an obliquely extending member 247 connected thereto, the opposite ends of which have apertures through which extend rods 248 and 249. The forward ends of the rods 248 and 249 extend through integral lugs 250 and 251 on the upper and lower sides of the slide 67, see Fig. 23, and the outer ends of the rods 248 and 249 are provided with heads engaging the outer faces of the lugs 250 and 251. The rear ends of the rods 248 and 249 are threaded and provided with nuts 252 and 253, respectively. Hence, when the piston 246 is moved to the left, as viewed in Fig. 5, a longitudinal force is exerted on the slide in this direction, that is, in a direction urging it away from the die support and dies. The piston 246 is continuously urged in the direction just mentioned by air under pressure which is introduced into the cylinder through a conduit 254 and which may be connected to a suitable source of supply, either by connection with the conduit 101 or by means of a separate conduit.

Each blank, after it has been headed by the punches operating upon the blank sequentially at stations 2 and 3, see Fig. 34, is positioned thereafter at station 4, through indexing of the die support and dies. The headed blank is then displaced from the machine by the blank removing member 88 which is reciprocated in timed relationship with the feeding of a blank into a die, upsetting of the previously fed blanks, and the indexing of the die support. This movement of the blank removing or knockout member 88 is effected by a drive actuated by the gear sector 72 and which is rocked in timed relationship with the rotation of the main crankshaft 60 by means of the eccentric 69 and the crankarm 70.

Referring now to Figs. 25 to 30, it will be seen that the teeth 74 on the sector 72 engage the teeth on the pinion 75 so that the latter is alternately rotated in reverse directions during operation of the machine. Between the pinion 75 and the crankshaft 76 is a one revolution, unidirectional clutch 77, see Fig. 28, which includes a pawl carrier member 255 that is keyed to the crankshaft 76 for rotation therewith. The pawl carrier 255 has a recess 256 in the periphery thereof in which a pawl 257 is rockably supported. A second recess is provided in the carrier 255, spaced from the recess 256, and in this second recess is pivotally supported a second pawl 258. The interior wall of the pinion 75 is provided with a notch 259 having intersecting surfaces such that the pawl 257 is adapted to engage therein and provide a driving connection between the pinion and the pawl carrier 255 when the pinion 75 is rotated in the counterclockwise direction as viewed in Fig. 28. The pinion 75 is also provided with a second notch or recess 260 on its inner periphery in which the pawl 258 is adapted to engage, the cooperating surfaces of the pawl 258 and notch 260 being such that the carrier 255 cannot rotate in the counterclockwise direction relative to the pinion 75 when the pawl is engaged with the pinion. The pawls 257 and 258 are continuously urged outwardly of the carrier 255 by compression spring means 261 in the carrier 255 engaging the inner sides of the pawls.

Adjacent the pinion 75, the frame of the machine is provided with a stationary cam 262, the inner surface of which is adapted to be engaged by a cam follower, in the nature of a lever 263, which is connected with the pawl 258. The cam 262 is operative to move the pawl 258 from engagement with the notch 260 when the pinion and carrier have rotated to the position adjacent the cam 262 as indicated in Fig. 28.

The construction just described is such that when the gear sector 72 rotates the pinion 75 in the counterclockwise direction, as viewed in Fig. 28, the pawl 257 is engaged in the notch 259 and hence the rotation of the pinion is transmitted through the pawl to the carrier and thus to the crankshaft 76. Therefore, the crank 264 on the crankshaft 76, see Fig. 26, is rotated and acts through the connecting link 265, which is pivoted at 266 to the knockout member 88, to move the latter forwardly with respect to the dies so that the pin 89 enters the aligned die and displaces the blank therefrom. The rotation of the crankshaft and crank 264 continues through a complete revolution so that the member 88 and its pin 89 are restored to their original positions in which the pin 89 is removed from the aligned die.

During the rotation of the pinion and pawl carrier, the parts are initially accelerated from stationary position and the pinion is decelerated as the revolution is completed. Due to the inertia of the parts connected with the pawl carrier, this deceleration of the pinion would tend to cause the pawl carrier and crankshaft to overrun the pinion so that the reciprocating member 88 and its pin 89 might not come to rest in the fully retracted position but might again advance and move towards a die with subsequent breakage or damage when the die is subsequently indexed. The pawl 258 and the associated parts prevent such overrunning and improper operation. Thus, as the members are rotated counterclockwise from the position shown in Fig. 28, the cam follower 263 leaves the stationary cam 262 thus permitting the pawl 258 to enter the notch 260 of the pinion under the influence of the spring means 261. This occurs during the initial portion of the rotation and hence when the pinion 75 begins to decelerate, the pawl 258 is engaged with the notch 260 and positively prevents overrunning of the pawl carrier and shaft relative to the pinion.

As the revolution of the pinion and pawl carrier is completed, the cam follower 262 again moves adjacent the cam 262 and the latter acts to disengage the pawl from the notch 260 as indicated in Fig. 28. Consequently, when the pinion 75 is next rotated in the clockwise direction by the return movement of the sector 72, the pawl 258 permits the pinion to move relative to the carrier 255 and the crankshaft 76. Likewise, the pawl 257 is ineffective to provide a driving connection in this direction of rotation of the pinion since the surfaces of the notch 259 are such that, when the pinion rotates in a clockwise direction, the pawl 257 is cammed out of the opening 259 in the pinion against the force of the spring means 261. However, when the rotation of the pinion in the clockwise direction is completed and it begins to again rotate in the counterclockwise direction, the pawl 257 is reengaged in the notch 259 and reestablishes the driving relationship to the crankshaft 76 as previously described, the pawl 258 also again becoming active to prevent overrunning of the parts as will now be apparent.

When the pinion 75 is rotating clockwise, as viewed in Fig. 28, and the pawl carrier and crankshaft is not connected thereto, there is a tendency for the crankshaft to rotate due to the forces of gravity acting upon the crank 264 and link 265. In order to prevent this rotation and which would result in improper operation of the machine and/or damage thereto, the crankshaft 76 is provided with a friction brake 267, see Figs. 26 and 27. This brake is of conventional construction and comprises two segments 268 and 269 pivoted together at 270 and substantially surrounding the shaft 76, the other ends of the segments having upstanding ears which are adapted to be drawn together by a clamping screw 271. This screw is of sufficient length to extend exteriorly of the machine, as will be evident from Fig. 26.

To further positively insure that the crankshaft 76 will not rotate in a reverse direction from the position in which the pin 89 is retracted from the aligned die, a pawl 272 is pivoted to the frame at 273 and is adapted to rest upon the upper surface of a collar secured to the shaft and having a notch in which the nose of the pawl 272 engages under the force of gravity to prevent reverse rotation of the shaft and attached parts. It will be evident, however, that the pawl 272 does not interfere with rotation of the shaft 76 when it is coupled with the pinion 75 by the pawl carrier and pawls.

As mentioned heretofore, the blank removing or knockout member 88 has a reduced diameter member or pin 89 carried thereby which enters the dies sequentially to discharge blanks therefrom. In the event a blank should be jammed in a die, the member 89 or some of the attached driving parts might break. Therefore, in order to prevent damage to the driving mechanism for the knockout pin, a frangible connection is provided between the portion 89 and the main body of the member 88. In the illustrated embodiment, see Figs. 30, 31 and 32, the main body of the member 88 has an axially extending bore 274 therethrough of sufficient diameter to telescopically receive the pin or member 89 which has an enlarged or flared inner end. The forward end of the main portion of the member 88 is cut away and is provided with a removable block 275 which has a semicircular opening in the forward portion for reception of one-half the circumference of the pin 89, the other half of the circumference of the pin being received in the corresponding semicircular recess in the forward end of the main part of the member 88. The rear surfaces of these semicircular recesses or openings are enlarged to provide cooperating surfaces to engage the enlarged portion at the end of pin 89, thereby preventing displacement of the pin axially forwardly of the member 88.

The rear portion of the block 275 has a radially extending slot or opening in which a link 276 is pivotally supported by a transversely extending pivot pin 277. The link 276 is adapted to extend transversely behind the rear of the pin 89 and provide an abutment therefor, the link normally being secured in this position by a shear pin 278 carried by the block 275 and extending through the link 276 with the axis of the shear pin preferably intersecting the axis of the pin 89. A sleeve 279 is adapted to extend over the forward portion of the member 88 and over the block 275, the sleeve 279 being secured in this position by a threaded portion engaged with threads provided on the exterior of the member 88.

In the event a jammed blank results in excessive force being transmitted through the pin 89, the shear pin 278 will break allowing the link 276 to swing out of the path of the pin 89 to the position as shown in Fig. 32 so that the pin 89 can telescope rearwardly into the bore 274 of the member 88. Due to the fact that considerable force will be exerted on the pin 89 at the time of such breakage, there will be sufficient reaction, when the shear pin 89 breaks, to cause the pin 89 to completely leave the aligned die so that the parts will occupy the positions substantially as shown in Fig. 32. The shear pin may be readily replaced, and the blank removing or knockout pin restored to its operative position, by unscrewing the sleeve 279 and temporarily removing the block 275. When the shear pin has been replaced and the pin 89 moved to its operative position, the block 275 is replaced and the sleeve 279 is then restored to its normal position.

The headed blanks which are removed from the die at station 4, by the removing member or pin 89, drop into the top of a discharge chute 280 which is supported upon the frame with the upper end adjacent the die at station 4, the forward portion of the slide being offset at this location to accommodate the discharge chute as indicated in Figs. 1 and 21. The discharge chute extends downwardly to the side of the machine so that the blanks received therein roll by gravity through the chute and out the discharge opening 281 in the side of the machine, see Figs. 3 and 33. The headed blanks thus discharged may be received in a pan, conveyor or other means, not shown, by which they may be carried to machines for threading or performing other operations as may be desired.

As previously mentioned, the feed finger 85 is removably connected to the face of the slide 67. Moreover, the feed finger is adapted to move axially into the slide in the event a blank is not properly aligned with the die when the slide advances. For this purpose, the finger 85 has an enlarged portion 282 at the rear thereof which is connected with a collar 283 by means of a shear pin 284, see Fig. 38. The collar 283 and the feed finger are removably connected to the face of the slide 67 by a cap member 285 which is secured in place by screws or the like 286. The feed finger 85 is thus mounted in alignment with a bore 287 extending longitudinally in the slide 67 and, hence, if an improperly aligned blank is encountered or a blank fails to properly enter a die, the shear pin 284 will break and the feed finger will enter the bore 287. This relative axial movement between the feed finger and slide is employed to disengage the main clutch 56 thereby stopping the entire machine. For this purpose, the rear surfaces of the enlarged portion 282 of the feed finger has a frusto-conical shape and is adapted to engage the conically shaped end of a rod 288 extending through an opening in the slide to the top thereof. The upper end of the member 288 is enlarged and engages the actuating portion 289 of an electrical switch 290. This switch is connected in a control circuit for the solenoid-operated valve 102 for the clutch 56, as will be hereinafter described.

A means is also provided to automatically stop the machine in the event a blank remains in a die at the fourth station after the knockout pin has operated to effect removal thereof and which failure to effect removal will no doubt have resulted in breaking of the shear pin 278 in the knockout member. For this purpose, a bell crank lever 291 is pivoted at 292 to the die block 170, see Fig. 37, the lever 291 having an arm 293 extending adjacent a die at the fourth station so that the lever is engaged by a headed blank and rocked thereby to the broken line position as shown in Fig. 37. The lever 291 has a downwardly extending arm 294 which in the normal position of the lever, as shown in full lines in Fig. 37, engages the actuating member 295 of an electrical switch 296, thereby normally maintaining the movable contact of the switch in closed position. However, when the head of a blank engages the arm 293, the arm 294 is moved from engagement with the actuating member 295 so that the movable contact of the switch 296 is opened.

The movable contact of the switch 296 is disposed in the energizing circuit for the solenoid of the main clutch controlling valve 102. However, opening of the contact of the switch 296 does not immediately deenergize the clutch valve solenoid. Instead the circuit remains closed through a cam-operated switch 4LS until after the knockout pin has completed its stroke. Consequently, if the knockout pin removes the headed blank from the die, the arm 294 drops to its initial position reclosing the movable contact of switch 296 and the clutch valve solenoid is not deenergized so that the machine continues in operation. However, if a blank should remain in the die after operation of the knockout means, the subsequent opening of the cam-actuated switch 4LS occurs while the switch 296 is in circuit opening position and the clutch valve solenoid is deenergized, thereby stopping the machine.

The cam-operated switch 4LS just mentioned is one of four similar switches; namely, switches 1LS, 2LS, 3LS and 4LS, which are contained in a housing 297 supported on the frame of the machine adjacent the shaft 80, see Figs. 3 and 39. Each of these switches is similar in nature and hence only one need be described in detail. Referring to Fig. 39, switch 1LS is illustrated and, as shown, comprises a pair of spaced stationary contacts 298 and 299 insulated from each other and supported upon an arm or bracket 300 secured to the base 301 of the switch housing. Adjacent the arm or bracket 301 is an arm 302 which is pivoted at one end to the base 301 and carries a conductive member 303 adjacent the other end which is adapted to bridge the contacts 298 and 299. Intermediate its ends, the arm 302 is provided with a cam follower or roller 304 which rides upon the periphery of a cam 305 secured to a camshaft 306. Intermediate the arm or bracket 300 and the arm 302 is a spring 307 which acts to maintain the cam folower in engagement with the cam 305 and moves the arm 302 to circuit opening position when the cam follower 304 encounters a lower portion such as 308 of the cam 305. The camshaft 306 is provided, exteriorly of the housing 297, with a gear 309 which meshes with a gear 310 on the shaft 80 and hence the camshaft 306 is continuously rotated during normal operation of the machine with the camshaft making one revolution for each complete cycle of the machine operation.

Each of the switches 1LS, 2LS, 3LS and 4LS is constructed in the same manner but the cams for the switches 2LS, 3LS and 4LS have depressed portions at different locations and/or of different peripheral extents from the cam 305 in order that these switches may be operated at the desired times and for the desired intervals. The times of operation of each of the switches 1LS, 2LS, 3LS and 4LS can be readily determined from Fig. 40 which is a chart representing one complete cycle of operation of the machine and hence one complete rotation of the camshaft 306, the periods during which the respective switches are in circuit closing position being indicated in black adjacent the reference character for the switch.

The machine is provided with suitable lubricating means for the parts to certain of which oil under pressure is supplied, as is well understood in the art. Consequently, the base of the machine is so formed as to constitute an oil reservoir 311, see Fig. 3, from which oil is withdrawn through conduits 312 and 313 and, after passing through an oil filter 314, enters the intake of a pump 315 driven by a pump motor 316. The discharge side of the pump 315 is connected by a conduit 317 to a pressure responsive switch 318 and from the latter the oil is delivered through a conduit 319 to suitably connected conduits leading to the several parts which are to be lubricated and which conduits are not shown as they are well understood by those skilled in the art. Likewise, it will be apparent that a pressure relief valve may be provided for the output of the pump with a connection to the reservoir 311, thereby maintaining a predetermined maximum pressure in the system. The oil is also returned to the reservoir 311, after effecting its lubricating operations, through suitable drains, as will be readily understood.

The pressure responsive switch 318 is connected in the control circuit for the machine to govern the operation of the main clutch 56. This switch is maintained closed when the pump 315 is in operation and delivering oil at a pressure above a predetermined minimum value. However, when the pump is not operated, or the pressure delivered thereby drops below the predetermined minimum, the switch 318 opens, thereby deenergizing the clutch valve solenoid so that the clutch is disengaged and the machine stops.

The manner in which the switch 318 and the other switches are connected in the control circuit will be apparent from Fig. 41 which is a simplified schematic representation of an electrical circuit for the machine. As will be apparent from this figure, the control circuit, in addition to the previously mentioned switches, includes a manually-operated, start-stop switch 320 which is adapted to remain in the position to which it is actuated and is normally employed only for initial energization or deenergization of the machine. In addition, there is a start switch 321 which is normally open except when the operator positively holds it in circuit closing position and it is this switch which is employed for controlling starting and stopping of operative cycles of the machine when the latter is being intermittently operated. Likewise, a stop switch 322 is provided to stop the machine when it is in continuous operation and an inching switch 323 permits operation of the machine only when held closed for the usual "inching" type of operation.

The machine of this invention is so controlled that it may be intermittently operated by means of the inching switch 323 or that it may operate continuously through repeated cycles after a single actuation of the start switch 321. It is also possible to operate the machine through only one complete cycle with automatic stop thereafter either by a momentary actuation of the start switch 321 or only when the start switch 321 is held actuated for an appreciable portion of the operating cycle. Selection of these several modes of operation is effected by manual setting of a rotatable selector switch 324 which comprises a plurality of spaced, conductive segments on a rotatable insulating member, schematically indicated at 325. The conductive portion 326 of this switch when moved to operative position, is adapted to engage and interconnect the stationary contacts 327, 328 and 329. The conductive portion 330 is adapted, when placed in operative position, to engage and interconnect contacts 327, 328 and 331. The conductive portion 332 is adapted, when moved to operating position, to engage and interconnect contacts 327, 328 and 333, while the conductive portion 334 is adapted, when actuated to operative position, to engage and interconnect contacts 328 and 335.

Electrical power is supplied to the control circuit from suitable power lines L1, L2 through a disconnect switch 336 and through fuses or circuit breakers 337, 338 to wires 339 and 340. The oil pressure switch 318, the feed finger actuated switch 290, the switch 296 operated by a headed blank, and the stop switch 322 are connected in series with each other and with the wire 339. From the stop switch 322 a wire 341 is connected to the normally open inching switch 323 and the latter is connected by a wire 342 to the contact 335. Extending from the wire 339 is a wire 343 which is adapted to be connected with a wire 344 by a contact 320a of the start-stop switch 320. The wire 344 is connectible with one terminal of the solenoid 345 which controls operation of the clutch valve 102 by means of a contact M1 of a relay M. The other terminal of the solenoid 345 is connectible with a wire 346 by the contact M2 of relay M and the wire 346 is adapted to be connected to the wire 340 by the contact 320b of the switch 320. The switch 4LS is connected in parallel about switch 296 by wires 347 and 348.

A wire 349, connected to the wire 341, is normally connected to a wire 350 by the contact 321b of switch 320 and is also adapted to be connected with the wire 350 by the contact 321a when switch 321 is actuated. The switch 321, therefore, provides a circuit therethrough, and through the switch 1LS, to one terminal of the coil of a relay N, the other terminal of which is connected to the wire 340. The energization of switch N causes closing of its contact N1 which is bridged by wires 351 and 352 about the switch 321. When switch 321 is actuated, the energization of solenoid N also closes its lower contact N2 to complete a circuit from the wire 341 through the contact 321b of switch 321 and the contact N2 to a wire 353 which is connected with the stationary contact 327 of the selector switch 324. The stationary contact 328 of the switch 324 is connected by a wire 354 to one terminal of the coil of relay M, the other terminal of which is connected with the wire 340. The contact 331 of selector switch 324 is connected by wires 355 and 356 in a circuit which is adapted to be closed to the wire 341 by the closing of the contact M3 of relay M. The contact 329 of switch 324 is connected by a wire 357 to the switch 3LS and closing of the latter completes a circuit to a wire 358 which is connected with the wires 355 and 356. The contact 333 of the switch 324 is connected to the switch 2LS and the circuit continues through the latter to the wire 358. The motor 316 for the oil pump is connected between the wires 339 and 340 by wires 359 and 360.

It is believed that the operation of the control circuit will be best understood by describing the several modes in which the machine may be operated.

Let it be assumed first that the machine is to operate continuously. The selector switch will then be moved so that the conductive portion 330 engages the stationary contacts 327, 328 and 331. The main line switch 336 is closed, thereby energizing the pump motor 316 so that oil under pressure is delivered to the machine. This will operate the pressure responsive switch 318 to closed position and the switches 290 and 296 will also be closed since they are normally in that position. The operator then presses the start button 320, thereby closing the circuits through its contacts 320a and 320b, this switch remaining in its actuated position until such time as the operator again actuates it, as for example, when the machine is to be shut down.

The closing of the oil pressure switch 318 has established a circuit through the lower circuit 321b of start switch 321 and through the normally closed limit switch 1LS to the coil of relay N. This circuit is completed from the coil of this relay to the wire 340, thereby energizing the relay so that its contacts N1 and N2 are closed. The closing of the contact N1 provides a holding circuit for the energizing circuit of the relay N while closing of the circuit N2 prepares a circuit for continuous operation of the machine when the start switch 321 is operated.

The operator now momentarily depresses the start switch 321. This moves the contact 321b from its position as shown in Fig. 41 to the position in which it completes the circuit through the N2 contact of relay N to the wire 353, which circuit continues through the conductive segment 330 and the now bridged contacts 327, 328 to the wire 354, the circuit continuing through the coil of the relay M to the wire 340. The resulting energization of relay M causes closing of its contacts M1, M2 and M3. Closing of the contacts M1 and M2 energizes the solenoid 345 of the clutch valve 102 so that air under pressure is now supplied to the main valve 56 and to the brake 57. The release of the start button breaks the circuit through the contact N2 of relay N but does not deenergize this relay or the relay M because the relay N remains energized through the holding circuit provided by the contact N1 while the relay M remains energized through a holding circuit provided from the wire 341 through the now closed contact M3, wires 356, 355, the conductive portion 330 and wire 354. Consequently, the valve 102 is held open so that the air supplied therethrough disengages the brake 57 and engages the clutch 56.

The engagement of the clutch 56 and disengagement of the brake 57 now causes the drive member 54 to rotate the main drive shaft 55, thereby driving the slide crankshaft 60, the shaft 80 and the gear sector 72. Rocking of the gear sector 72 operates through the shaft 73 and the stock feeding mechanism, including the clutch 126, to feed elongated stock into engagement with the stock stop 136 and the rotation of the shaft 80 moves the shear member 138 in timed relationship with this feeding of the stock to sever the portion of the stock projecting beyond the die 135. During this severing operation, the blank is prevented from bending by the back-up lever or finger 140 which is moved to release the blank at the end of the shearing operation. The sheared blank is then elevated from the shear member 138 by the spring-pressed plunger 146 and the blank enters into the feed chute or magazine. During the operation of the machine, blanks are thus continuously cut and delivered to the magazine and maintained therein in parallel relationship with the lowermost blank aligned with the die at the first station, see Fig. 34.

The rotation of the crankshaft 60 moves the slide 67 towards the die support and dies so that the feed finger 85 engages the blank in the lowermost part of the feed magazine and moves the latter axially so that it begins entrance into the die at station 1. At this time, the die locking member or pin 199 is in engagement with the die support so that the latter is held from rotation. As the slide further approaches the dies, a blank B1 which has been previously partially fed into a die by the feed finger at the first station, during a previous cycle of operations, will now be positioned at the second station and hence the punch 90 will engage such blank and move it into the die until it is in firm engagement with the gauging pin 86 and the latter is in firm engagement with the anvil member 87.

During the latter part of the forward movement of the slide 67, the punch 90 will upset a part of the material of the blank B1 protruding from the die at station 2 and simultaneously therewith the punch 91 will engage a blank B2 in the die at station 3 which blank had been partially upset while at station 2 during a previous cycle of operations. Also, during this forward movement of the slide, the knockout pin 89 is driven, through the mechanism shown in Figs. 25 to 29, so that it moves forwardly with respect to the die support and enters the interior of a die at station 4, thereby displacing a previously headed blank. The length of stroke of the knockout pin is such, however, that the gauging member 86 is not removed from the die. This operation of the knockout pin is completed and the pin is removed from the die by the time the slide 67 begins its return movement.

As the slide 67 returns from engagement with the blanks, the shaft 80 will have rotated sufficiently so that the locking member or pin 199 is no longer held in engagement with the die support and hence the springs 201 will remove the locking member from engagement with the die support so that the latter may be indexed. When the locking member has thus been completely withdrawn, the indexing mechanism is operated by the rotation of the shaft 80 to rotatably index the die support 90°, thus moving each of the dies one station in a clockwise direction, as viewed in Fig. 34, so that the die which was previously at station 1 and in which a blank was partially inserted is now at station 2, the blank which was coned at station 2 is now moved to station 3, and the blank which was headed at station 3 is now at station 4. As the indexing operation is completed, the cam 193 will again become effective to force the locking member 199 into engagement with the next succeeding aperture 200 in the die support. In the event the indexing mechanism did not exactly align an opening 200 with the locking pin 199, the frusto-conical surfaces of the opening and pin will act to properly position the die support, slight yielding of the thrust member 197 in an axial direction during such aligned operation being permitted by the spring 207.

The locking member or pin 199 is firmly engaged within the opening 200 during the initial engagement of the cam 193 with the cam follower 196 and the further rotation of the cam 193 in engagement with the cam roller 196 maintains the locking member 199 in locking position so that the die support and die are held from rotation during the blank feeding, upsetting and discharge operations. With the die support thus firmly locked, the slide 67 again moves towards the die support and dies, thus feeding a new blank into the empty die at station 1, seating a previously fed blank in the die at station 2 and coning the protruding portion of this blank, as well as upsetting the blank which was previously coned at station 2. Likewise, as mentioned above, the previously headed blank, which is now at station 4, is discharged by the knockout pin when the slide is approaching the die support. Also, a new length of stock is fed and severed during reciprocation of the slide.

The operations just described will be continuously repeated during normal operation of the machine but the machine may be stopped at any time by momentarily actuating the stop switch 322. This breaks the circuits to the N and M relays, deenerigizing them with the result that the solenoid 345 is deenergized, thereby closing the valve 102. Closing the valve 102 terminates the supply of air pressure to the clutch 56 and brake 57. Consequently, the brake is engaged and the clutch disengaged with the result that all operations of the machine terminate with the exception of the lubricating pump motor 316.

As has been mentioned above, the control circuit for the machine is provided with means by which the operation may be automatically terminated in the event the oil pressure drops below a predetermined value, or the feed finger is broken, or a blank is not dislodged by the knockout pin. Thus, in the event the oil pressure falls below a predetermined value, the switch 318 will open, breaking the energizing circuit to the N and M relays so that the valve 102 is closed, thereby disengaging the clutch 56 and engaging the brake 57 thus stopping the machine, as will be readily apparent. In the event a blank is not properly aligned with a die in the station 1 or if a bent blank should fail to properly enter the die at this position, the excessive force exerted by the feed finger 85 will result in breaking of the shear pin 284 so that the feed finger is forced into the bore 287 in the slide, thereby displacing the member 288 so that the switch 290 is opened. This likewise acts to break the energizing circuit for the N and M relays thereby closing the valve 102 so that the clutch 56 is disengaged and the brake 57 engaged thus stopping the machine.

During each operative cycle of the machine, a headed blank engages the bell crank lever 291 as the die support is indexed to bring the headed blank to station 4. This causes switch 296 to open but the circuit for the N and M relays is not immediately broken since the cam-operated switch 4LS will be in circuit closing position until the drive for the knockout pin has operated to the position corresponding with maximum entry of the knockout pin into the die at station 4. By the time this knockout drive mechanism is moving in the return direction, the shaft 80 will have rotated sufficiently so that the cam-actuated switch 4LS is opened. Hence, if a blank is still engaging the bell crank lever 291, due to the fact that it is jammed in the die, the switch 296 will still be open and hence, since switch 4LS is now open, the circuits to the N and M relays are broken. Therefore, the solenoid 345 will be deenergized so that air supply valve 102 is closed thus disengaging the clutch 56 and engaging the brake 57 stopping the machine. This failure of a blank to be dislodged will also, no doubt, have resulted in breaking of the shear pin 278 and hence it will be necessary to retract the sleeve 279 to restore the knockout pin 89 to its initial position and replace the shear pin 278.

Should the machine be stopped by any of the means just described, it will not automatically restart upon rectifying the condition which caused the stopping since the holding circuit for the N and M relays have also been interrupted, therefore, it is necessary to again momentarily actuate the start switch 321 before operations can be resumed.

Should it be desired to operate the machine through one cycle only, this can be effected by positioning the selector switch 324 so that the conductive portion 332 engages the contacts 327, 328 and 333. The start switch 320 will, of course, be in closed position. Hence, momentary actuation of switch 321 will now start the machine since a circuit will have been completed through contact 321a and the cam-operated switch 1LS so that the N relay is energized and has closed its contacts N1 and N2. As before, the N1 contact provides a holding circuit for relay N while the 321b contact operates to complete a circuit through the now closed N2 contact, wires 353, conductive portion 332, and wire 354 to the M relay energizing the latter. This energization of the M relay closes the contacts M1, M2 and M3 so that solenoid 345 is energized, opening the valve 102, with the result that the clutch 56 is engaged and brake 57 is disengaged thereby placing the machine in operation.

The closing of contact M3 provides a holding circuit through the latter and through cam-operated switch 2LS, wire 361, conductive portion 332, and wire 354 to the relay M maintaining the latter energized, therefore, the machine will continue to operate through one cycle. When the cycle has been completed, the switch 2LS will be moved to open position by its cam, as will be apparent from the chart in Fig. 40. This breaks the holding circuit for relay M so that the latter opens, deenergizing the solenoid 345 thereby causing the valve 102 to close and thus terminating engagement of clutch 56 and engaging the brake 57. Just prior to the completion of the cycle, the cam-operated switch 1LS will have been momentarily opened by its cam, as indicated by the chart in Fig. 40. This breaks the circuit to the relay N so that it is deenergized thus opening the contacts N1 and N2 with the result that the relay M is not again energized until the start button 321 is reactuated, therefore, the machine can be operated through one complete cycle and automatically stopped by a single, momentary actuation of the start switch 321. The operation of the several parts of the machine during this cycle of operations will be otherwise the same as described above for continuous operation.

During initial setup and adjustment of the machine, it is sometimes desirable to have the machine operate for a single cycle but under control of the operator so that, at least during the initial portion of the operation, he can stop the machine by simply releasing the start button. Such operation is possible by positioning the switch 324 so that the conductive portion 326 is in engagement with the contacts 327, 328 and 329. With the circuit thus conditioned, the operator presses the start button 321 and holds the button depressed.

The N relay is energized as before and remains energized due to the closing of its N1 contact. The closing of the N2 contact also results in energizing the M relay through a circuit extending through the now closed contacts 321b and N2, wire 353, conductive portion 326, and wire 354. It will be observed, however, that this energization of the M relay is maintained during substantially the first one-half of the cycle of the machine operation by the operator maintaining the start switch 321 actuated. This is due to the fact that the holding circuit for the M relay through the M3 contact remains open at switch 3LS until the machine has moved substantially through one-half of its cycle, this being apparent from the chart of switch operations in Fig. 40. Consequently, the operator may stop the machine at any time during this initial portion of operation of the machine by simply releasing the start button 321. However, if the operations appear proper so that the operator retains the switch 321 engaged, the continued rotation of the shaft 80 will actuate switch 3LS to closed position thus completing a circuit through the M3 contact, wires 356, 353, and the now closed switch 3LS to the wire 357, and through the conductive segment 326 to the wire 354 thus maintaining the M relay energized so that the operator may now release the start switch 321. At the completion of the cycle of operations, however, the 3LS switch will open thus again breaking the circuit to the M relay and thereby stopping the machine as described above with respect to the operation for one cycle with short actuation of the start button.

It is also frequently desirable to be able to "inch" the machine, that is, cause it to operate only so long as the "inching" switch 323 is held actuated so that the machine can be stopped in any part of its cycle by simply releasing this switch. For this type of operation the selector switch 324 is positioned so that the conductive portion 334 engages the contacts 328 and 335. Hence, when the switch 323 is actuated, a circuit is completed through the latter and through the conductive portion 334 to the wire 354 thus energizing the M relay so that the solenoid 345 is energized thus opening the valve 102 and thereby engaging the main clutch 56 and disengaging the brake 57. The N relay is not energized, however, and no circuit is completed through the M3 contact and the M relay is energized only so long as the "inching" switch 323 is held closed and this relay is deenergized as soon as the switch is released. The machine will therefore, operate only while the operator holds the "inching" switch 323 closed.

During any of the above operations, reduction of oil pressure below the predetermined value, breaking of the shear pin 284 for the feed finger, or jamming of a headed blank in the machine will prevent further operation of the machine by breaking the energizing circuits to the N and M relays. This deenergizes the solenoid 345 and thereby closing valve 102 so that the supply of air to the main clutch and brake is terminated with the result that the clutch is disengaged and the brake applied.

Although the invention has been described in considerable detail as embodied in a machine constructed as shown in the drawings, it will be apparent that changes may be made in various parts of the structure by those skilled in the art without departing from the principles of the invention. Without restriction thereto, it may be noted that among such changes are the provision of more than four dies with corresponding change in the number of indexed positions, number of punches and the like. Likewise, additional switches may be provided in the control circuit for terminating operation in response to improper operation of the machine. These and other modifications which may be made by others skilled in the art are considered as included within the scope of the invention.

Having thus described the invention, I claim:

1. A heading machine comprising a rotatable die support provided with a plurality of dies adapted to receive blanks the ends of which are to be upset, a slide supported for reciprocation towards and from said die support and provided with punch means to upset the ends of blanks protruding from the dies, a main drive shaft operatively connected to said slide to reciprocate the latter, means operatively connected to said drive shaft to rotatably index said die support in timed relationship with the reciprocation of said slide, means for sequentially introducing blanks into said dies in timed relationship with the indexing of the die support, means connected to said drive shaft for removing the upset blanks from said dies in timed relationship with the indexing of the die support, a rotatable driving member, a clutch between said driving member and shaft providing an operative connection therebetween when engaged, means to terminate engagement of said clutch in response to presence of a blank remaining in the die after said blank removing means has operated thereon, electric circuit control means for controlling said clutch, said clutch terminating means comprising means spaced on said die support to sense the presence of a blank in a die at the indexed position of said die support at which blank removal is effected, electrical switch means operated by said sensing means, and circuit means connected between said switch means and said electrical control means for said clutch to terminate engagement thereof when said sensing means engages a blank remaining in a die, said electric circuit including switch means therein operated in timed relationship with said blank removing means for rendering the first-mentioned switch means inoperative to terminate engagement of said clutch until after said blank removing means has been actuated.

2. A heading machine comprising a rotatable die support provided with a plurality of dies adapted to receive blanks the ends of which are to be upset, a slide supported for reciprocation towards and from said die support and provided with punch means to upset the ends of blanks protruding from the dies, a main drive shaft operatively connected to said slide to reciprocate the latter, means operatively connected to said drive shaft to rotatably index said die support in timed relationship with the reciprocation of said slide, a feed finger connected to said slide for sequentially introducing blanks into said dies in timed relationship with the indexing of the die support, the connection of said feed finger to said slide including means permitting relative movement therebetween upon failure of a blank to properly enter a die, said connection further including a frangible member adapted to break when a blank fails to properly enter a die, means connected to said drive shaft for removing the upset blanks from said dies in timed relationship with the indexing of the die support, a rotatable driving member, an electrically controlled clutch between said driving member and shaft providing an operative connection therebetween when engaged, means to terminate engagement of said clutch in response to said relative movement between said feed finger and slide, said means to terminate engagement of said clutch including a device operatively connected to control said clutch engagement and positioned for engagement by said feed finger when said frangible member breaks, said latter-mentioned device comprising an electric switch operatively connected to the control for said clutch and a switch actuating member engaged by said feed finger when said frangible member breaks.

3. A heading machine comprising a rotatable die support provided with a plurality of dies adapted to receive blanks the ends of which are to be upset, a slide supported for reciprocation towards and from said die support and provided with punch means to upset the ends of blanks protruding from the dies, a main drive shaft operatively connected to said slide to reciprocate the latter, means operatively connected to said drive shaft to rotatably index said die support in timed relationship with the reciprocation of said slide, a feed finger connected to said slide for sequentially introducing blanks into said dies in timed relationship with the indexing of the die support, the connection of said feed finger to said slide including means permitting relative movement therebetween upon failure of a blank to properly enter a die, means connected to said drive shaft for removing the upset blanks from said dies in timed relationship with the indexing of the die support, a rotatable driving member, a clutch between said driving member and shaft providing an operative connection therebetween when engaged, said clutch being provided with a fluid pressure operated means to effect engagement thereof, and means to terminate engagement of said clutch in response to said relative movement between said feed finger and slide, said means to terminate engagement of the clutch including valve means controlling the application of fluid under pressure to the clutch engaging means and a means actuated by said relative movement between said feed finger and slide operatively connected to said valve means to actuate the latter.

4. A heading machine comprising a rotatable die support provided with a plurality of dies adapted to receive blanks the ends of which are to be upset, a slide supported for reciprocation towards and from said die support and provided with punch means to upset the ends of blanks protruding from the dies, a main drive shaft operatively connected to said slide to reciprocate the latter, means operatively connected to said drive shaft to rotatably index said die support in timed relationship with the reciprocation of said slide, a feed finger connected to said slide for sequentially introducing blanks into said dies in timed relationship with the indexing of the die support, the connection of said feed finger to said slide including means permitting relative movement therebetween upon failure of a blank to properly enter a die, means connected to said drive shaft for removing the upset blanks from said dies in timed relationship with the indexing of the die support, a rotatable driving member, a clutch between said driving member and shaft providing an operative connection therebetween when engaged, said clutch being provided with a fluid pressure operated means to effect engagement thereof, and means to terminate engagement of said clutch in response to said relative movement between said feed finger and slide, said means to terminate engagement of the clutch including valve means controlling the application of fluid under pressure to the clutch engaging means and a means actuated by said relative movement between said feed finger and slide operatively connected to said valve means to actuate the latter, a brake for said drive shaft, fluid pressure operated means for releasing said brake, and connections from said valve means to said brake for terminating application of fluid pressure to the latter simultaneously with the termination of application of fluid pressure to said clutch engaging means.

5. A heading machine comprising a rotatable die support provided with a plurality of dies adapted to receive blanks the ends of which are to be upset, a slide supported for reciprocation towards and from said die support and provided with punch means to upset the ends of blanks protruding from the dies, a main drive shaft operatively connected to said slide to reciprocate the latter, means operatively connected to said drive shaft to rotatably index said die support in timed relationship with the reciprocation of said slide, means for sequentially introducing blanks into said dies in time relationship with the reciprocation of said slide and indexing of the die support, said means for introducing blanks into the dies comprises a feed finger connected to said slide by a frangible member, means connected to said drive shaft for removing the upset blanks from the dies in timed relationship with reciprocation of the slide and indexing of the die support, a rotatable driving member, an electrically controlled clutch between said driving member and shaft adapted to provide an operative connection therebetween when the clutch is engaged, an electric control circuit for said clutch including switch means actuated in timed relationship with the rotation of said drive shaft to terminate engagement of the clutch when the machine has completed one cycle of reciprocation of the slide and indexing of the die support, switch means in said circuit responsive to movement of said feed finger relative to said slide as the result of the breaking of said frangible member for effecting disengagement of said clutch, and manually operable selector switch means in said circuit selectively actuatable to render inoperative the switch means actuated in timed relationship with the rotation of said drive shaft thereby permitting continuous operation of the machine through repeated cycles.

References Cited in the file of this patent
UNITED STATES PATENTS

| Number | Name | Date |
|---|---|---|
| 385,080 | Whitaker | June 26, 1888 |
| 914,799 | Cornbrooks | Mar. 9, 1909 |
| 1,004,247 | Duston | Sept. 25, 1911 |
| 1,024,046 | Weeks | Apr. 23, 1912 |
| 1,136,891 | Candee | Apr. 20, 1915 |
| 1,148,245 | Martin | July 27, 1915 |
| 1,637,107 | Dwyer et al. | July 26, 1927 |
| 1,803,992 | Bauck | May 5, 1931 |
| 1,835,591 | Bullard | Dec. 8, 1931 |
| 1,843,884 | Prussing | Feb. 2, 1932 |
| 1,874,158 | Bausman | Aug. 30, 1932 |
| 1,955,061 | Friedman | Apr. 17, 1934 |
| 1,977,824 | Fair | Oct. 23, 1934 |
| 2,028,354 | Roe | Jan. 21, 1936 |
| 2,065,820 | Mellon | Dec. 29, 1936 |
| 2,095,094 | Glasner | Oct. 5, 1937 |
| 2,104,297 | Friedman | Jan. 4, 1938 |
| 2,104,944 | Friedman | Jan. 11, 1938 |
| 2,134,933 | Smith | Nov. 1, 1938 |
| 2,227,810 | Mitchell | Jan. 7, 1941 |
| 2,236,221 | Shwayder | Mar. 25, 1941 |
| 2,254,316 | Rider | Sept. 2, 1941 |
| 2,318,825 | Wilcox | May 11, 1943 |
| 2,337,696 | Van Nest | Dec. 28, 1943 |
| 2,384,590 | Baldenhofer | Sept. 11, 1945 |
| 2,395,722 | Buchet | Feb. 26, 1946 |
| 2,577,882 | Foster | Dec. 11, 1951 |
| 2,589,849 | Oetiker | Mar. 18, 1952 |
| 2,664,579 | Akey | Jan. 5, 1954 |